(12) United States Patent
Kobayashi et al.

(10) Patent No.: US 12,323,705 B2
(45) Date of Patent: Jun. 3, 2025

(54) CONTROL METHOD AND IMAGING APPARATUS

(71) Applicant: FUJIFILM Corporation, Tokyo (JP)

(72) Inventors: Toshiki Kobayashi, Saitama (JP); Koichi Tanaka, Saitama (JP); Kazuki Ishida, Saitama (JP); Keito Kamio, Saitama (JP); Takeya Abe, Saitama (JP); Takuro Abe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 284 days.

(21) Appl. No.: 17/932,193

(22) Filed: Sep. 14, 2022

(65) Prior Publication Data

US 2023/0102521 A1    Mar. 30, 2023

(30) Foreign Application Priority Data

Sep. 30, 2021    (JP) ................. 2021-161789

(51) Int. Cl.
*H04N 23/68*    (2023.01)
*H04N 23/63*    (2023.01)
*B64U 101/30*    (2023.01)

(52) U.S. Cl.
CPC .......... *H04N 23/687* (2023.01); *H04N 23/63* (2023.01); *H04N 23/681* (2023.01); *B64U 2101/30* (2023.01)

(58) Field of Classification Search
None
See application file for complete search history.

(56) References Cited

U.S. PATENT DOCUMENTS

| | | | | |
|---|---|---|---|---|
| 10,880,464 | B1* | 12/2020 | Kim | ............... G06T 7/20 |
| 11,363,201 | B2* | 6/2022 | Nyström | ............ H04N 23/6811 |
| 11,431,907 | B2* | 8/2022 | Saito | ............... H04N 23/6812 |
| 11,838,658 | B2* | 12/2023 | Miyazawa | ......... H04N 23/6815 |
| 2015/0277140 | A1* | 10/2015 | Minamisawa | ........... G03B 5/06 |
| | | | | 359/557 |

(Continued)

FOREIGN PATENT DOCUMENTS

| | | |
|---|---|---|
| JP | H04-163535 A | 6/1992 |
| JP | 2017-134190 A | 8/2017 |

(Continued)

OTHER PUBLICATIONS

"Notice of Reasons for Refusal" Office Action issued in JP 2021-161789; mailed by the Japanese Patent Office on Feb. 12, 2025.

*Primary Examiner* — Cynthia Segura
(74) *Attorney, Agent, or Firm* — Studebaker Brackett PLLC

(57) ABSTRACT

A control method used in a system including a moving body and an imaging apparatus includes an acquisition step of acquiring factor information, including movement information related to the moving body, via the imaging apparatus, an adjustment step of adjusting a position of a moving mechanism that moves an image sensor or an imaging lens provided in the imaging apparatus, based on the factor information, an imaging step of imaging a subject by using the image sensor after the adjustment step is executed, and a correction step of correcting a shake applied to the image sensor or the imaging lens by using the moving mechanism in a case in which the imaging step is executed.

20 Claims, 27 Drawing Sheets

(56) References Cited

U.S. PATENT DOCUMENTS

| | | | |
|---|---|---|---|
| 2015/0350507 A1* | 12/2015 | Topliss | H04N 23/687 |
| | | | 348/208.2 |
| 2018/0227469 A1 | 8/2018 | Osanai et al. | |
| 2018/0376066 A1* | 12/2018 | Ishita | H04N 23/6812 |
| 2019/0306407 A1 | 10/2019 | Ely et al. | |
| 2020/0137310 A1 | 4/2020 | Zhang et al. | |
| 2021/0116941 A1* | 4/2021 | Lee | G01S 17/894 |
| 2021/0258490 A1* | 8/2021 | Saito | H04N 23/6812 |
| 2021/0337123 A1* | 10/2021 | Nyström | H04N 23/683 |
| 2022/0182553 A1* | 6/2022 | Ito | H04N 23/6811 |
| 2023/0127736 A1* | 4/2023 | Miyazawa | H04N 23/687 |
| | | | 348/208.1 |

FOREIGN PATENT DOCUMENTS

| | | | |
|---|---|---|---|
| JP | 2017-175366 A | 9/2017 | |
| JP | 2017-204835 A | 11/2017 | |
| JP | 2019-003035 A | 1/2019 | |
| JP | 2019-009751 A | 1/2019 | |
| JP | 2019-092037 A | 6/2019 | |
| JP | 2021-082932 A | 5/2021 | |
| JP | 2021-520100 A | 8/2021 | |

* cited by examiner

CONTROL METHOD AND IMAGING APPARATUS

CROSS-REFERENCE TO RELATED APPLICATIONS

This application claims priority under 35 USC 119 from Japanese Patent Application No. 2021-161789 filed on Sep. 30, 2021, the disclosure of which is incorporated by reference herein.

BACKGROUND OF THE INVENTION

1. Field of the Invention

The technology of the present disclosure relates to a control method and an imaging apparatus.

2. Description of the Related Art

JP2021-082932A discloses an optical device including a calculation unit that calculates a subject angular velocity based on a captured image, and a controller that corrects an image shake related to a subject during panning by driving a correction unit based on the calculated subject angular velocity, in which the controller determines a correction position of the image shake related to the subject in accordance with an imaging scene based on subject information including the imaging scene, and drives the correction unit based on the subject angular velocity calculated based on the correction position of the image shake.

JP2019-092037A discloses an imaging apparatus that can perform panning, the imaging apparatus comprising a first calculation unit that calculates an angular velocity of a subject with respect to the imaging apparatus based on a movement vector of the subject and movement of the imaging apparatus based on temporally continuous images, a second calculation unit that calculates angular acceleration of the subject with respect to the imaging apparatus based on a plurality of angular velocities calculated by the first calculation unit, a determination unit that determines the angular velocity of the subject with respect to the imaging apparatus during exposure in accordance with the angular acceleration calculated by the second calculation unit, and a correction unit that corrects an image shake of the subject by moving a correction element based on the angular velocity determined by the determination unit, in which the determination unit changes the angular acceleration used to determine the angular velocity of the subject with respect to the imaging apparatus during exposure in accordance with whether or not the angular acceleration calculated by the second calculation unit is included in a range corresponding to the angular velocity calculated by the first calculation unit.

JP1992-163535A (JP-H04-163535A) discloses a camera shake prevention device including an image shake detection unit that detects a shake of an image based on an output of an image sensor, a mechanical shake detection unit that detects a shake based on an output of a mechanical sensor provided inside a camera to calculate the shake of the image due to the shake, a subject moving speed detection unit that detects information related to a moving speed of a subject from the output of the image shake detection unit and the mechanical shake detection unit, a shake correction amount calculation unit that calculates a shake correction amount during exposure from the moving speed of the subject and an exposure time, an initial position setting unit that presets an initial position of a shake correction mechanism of the camera based on the shake correction amount, and a shake correction controller that controls the shake correction mechanism based on the outputs of the image shake detection unit and the mechanical shake detection unit.

SUMMARY OF THE INVENTION

One embodiment according to the technology of the present disclosure provides a control method and an imaging apparatus capable of correcting, for example, a shake applied to an image sensor or an imaging lens in accordance with a factor related to a moving body.

A first aspect according to the technology of the present disclosure relates to a control method used in a system including a moving body and an imaging apparatus, the method comprising an acquisition step of acquiring factor information, including movement information related to the moving body, via the imaging apparatus, an adjustment step of adjusting a position of a moving mechanism that moves an image sensor or an imaging lens provided in the imaging apparatus, based on the factor information, an imaging step of imaging a subject by using the image sensor after the adjustment step is executed, and a correction step of correcting a shake applied to the image sensor or the imaging lens by using the moving mechanism in a case in which the imaging step is executed.

A second aspect according to the technology of the present disclosure relates to a control method used in a system including a moving body and an imaging apparatus, the method comprising an acquisition step of acquiring factor information, including movement information related to a speed and a direction of the moving body, via the imaging apparatus, an imaging step of imaging a subject by using an image sensor provided in the imaging apparatus, and a correction step of correcting a shake applied to the image sensor based on the factor information by using a moving mechanism that moves the image sensor in a case in which the imaging step is executed.

A third aspect according to the technology of the present disclosure relates to an imaging apparatus mounted on a moving body, the apparatus comprising a processor, in which the processor executes an acquisition process of acquiring factor information including movement information related to a speed and a direction of the moving body, an adjustment process of adjusting a position of a moving mechanism that moves an image sensor or an imaging lens provided in the imaging apparatus, based on the factor information, an imaging process of imaging a subject by using the image sensor after the adjustment process is executed, and a correction process of correcting a shake applied to the image sensor or the imaging lens by using the moving mechanism in a case in which the imaging process is executed.

DESCRIPTION OF THE PREFERRED EMBODIMENTS

In the following, an example of an embodiment of a control method and an imaging apparatus according to the technology of the present disclosure will be described with reference to the accompanying drawings.

Figure 1:
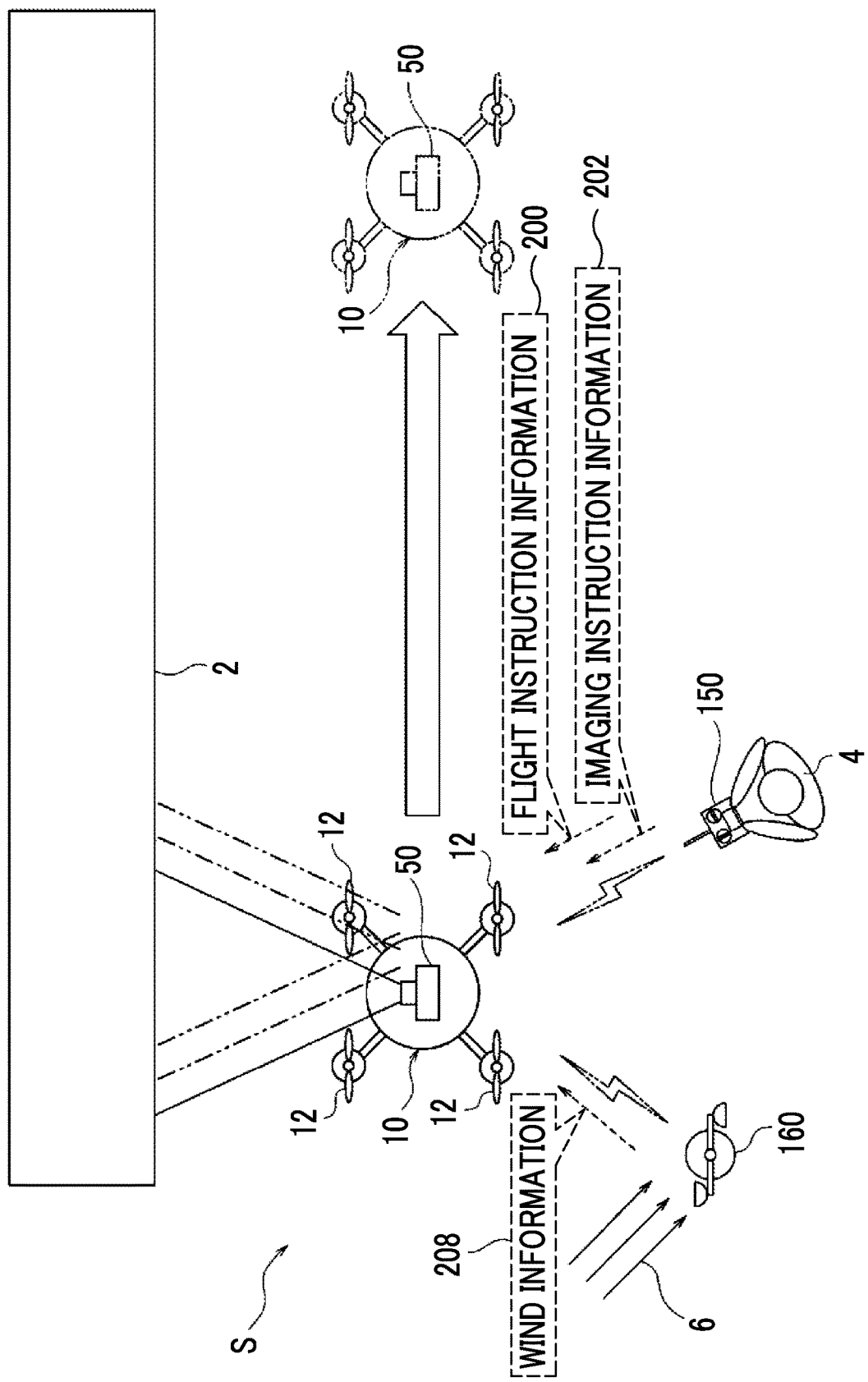
FIG. 1 is a plan view showing an example of an imaging system.

As an example, as shown in FIG. 1, an imaging system S is a system capable of imaging a target object 2, and comprises a flying object 10, an imaging apparatus 50, a transmitter 150, and an anemometer 160. The flying object 10 is an example of a "moving body" according to the technology of the present disclosure. The target object 2 is an example of a "subject" according to the technology of the present disclosure.

The flying object 10 is an unmanned aerial vehicle, such as a drone. The flying object 10 has a plurality of rotor blades 12. By adjusting the rotation speed of the plurality of rotor blades 12, the flying object 10 can move in a vertical direction, move in a horizontal direction, revolve, hover, and the like. FIG. 1 shows, as an example, a state in which the flying object 10 moves in the horizontal direction along the target object 2.

The imaging apparatus 50 is mounted on the flying object 10. The imaging apparatus 50 is a digital camera, for example. The imaging apparatus 50 is disposed in a direction of imaging the front of the flying object 10. While the flying object 10 moves in the horizontal direction along the target object 2, the imaging apparatus 50 images the target object 2 a plurality of times, so that panning is performed on the target object 2.

The transmitter 150 is communicably connected to the flying object 10 and the imaging apparatus 50. In a case in which the transmitter 150 receives a flight instruction by a user 4, the transmitter 150 transmits flight instruction information 200 indicating the flight instruction to the flying object 10. The flight instruction information 200 is instruction information for causing the flying object 10 to move in the vertical direction, move in the horizontal direction, revolve, hover, and the like. The flight instruction information 200 includes instruction information related to a speed and a direction in which the flying object 10 moves. The flying object 10 flies based on the flight instruction information 200.

In addition, in a case in which the transmitter 150 receives an imaging instruction by the user 4, the transmitter 150 transmits imaging instruction information 202 indicating the imaging instruction to the imaging apparatus 50. The imaging instruction information 202 is instruction information for causing the imaging apparatus 50 to image a subject (target object 2 as an example). The imaging apparatus 50 images the subject based on the imaging instruction information 202.

The anemometer 160 is communicably connected to the imaging apparatus 50. The anemometer 160 is installed in an environment in which the flying object 10 flies (hereinafter, referred to as flight environment). The anemometer 160 detects a speed of wind 6 generated in the flight environment (hereinafter, referred to as wind speed), and transmits wind information 208 corresponding to the detected wind speed to the imaging apparatus 50. The wind information 208 is an example of "wind information" according to the technology of the present disclosure.

Figure 2:
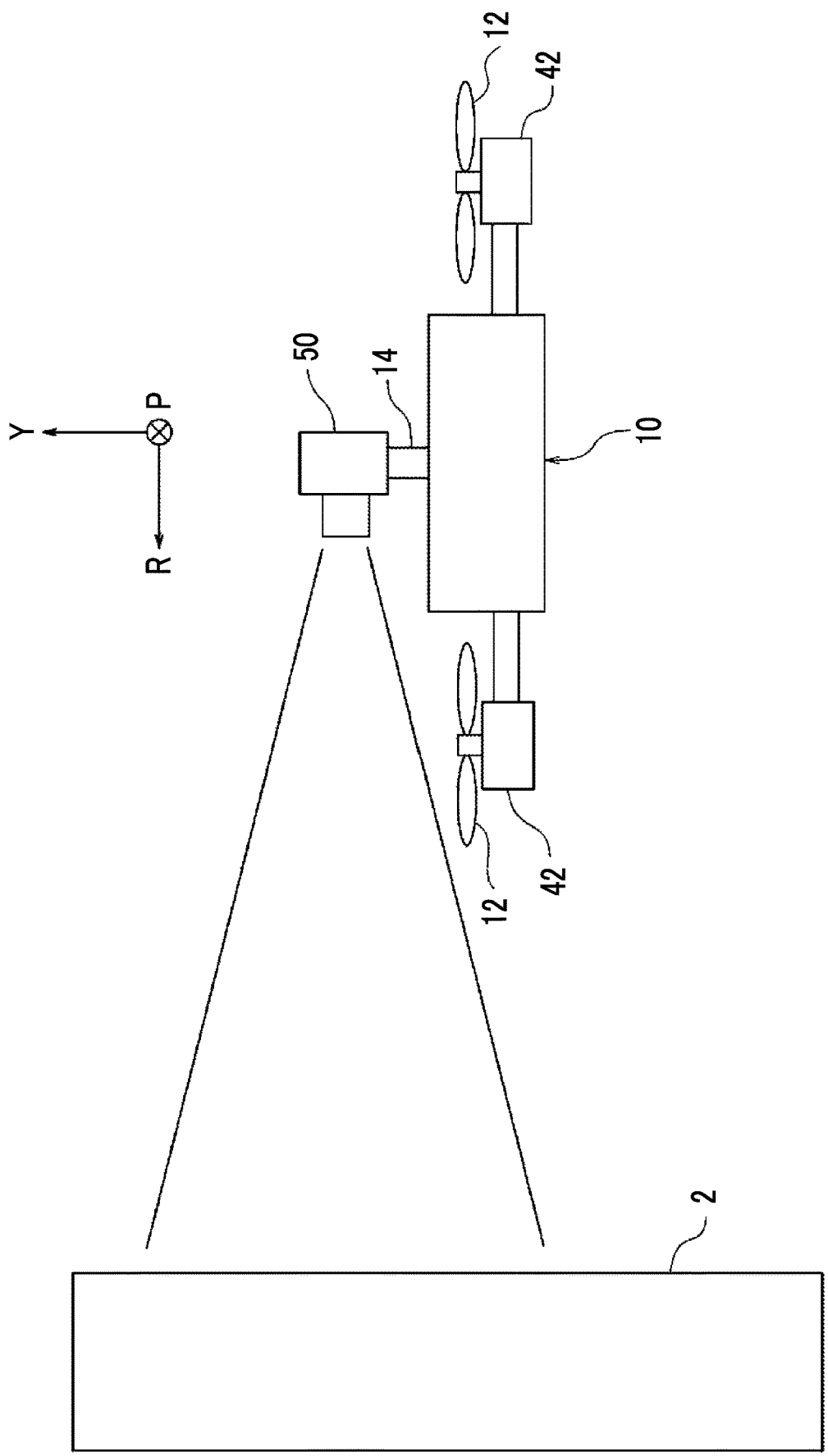
FIG. 2 is a side view showing an example of an imaging apparatus and a flying object.

As an example, as shown in FIG. 2, the flying object 10 comprises a gimbal mechanism 14. The gimbal mechanism 14 supports the imaging apparatus 50 with respect to the flying object 10. As an example, the gimbal mechanism 14 is a three-axis gimbal mechanism which is configured to absorb vibration generated around three axes. The gimbal mechanism 14 is attached to the imaging apparatus 50 in a direction in which the three axes of the gimbal mechanism 14 coincide with a yaw axis, a pitch axis, and a roll axis of the imaging apparatus 50. As an example, an axis Y, an axis P, and an axis R shown in FIG. 2 indicate the yaw axis, the pitch axis, and the roll axis of the imaging apparatus 50, respectively. The yaw axis, the pitch axis, and the roll axis of the imaging apparatus 50 coincide with the yaw axis, the pitch axis, and the roll axis of the flying object 10, respectively.

The gimbal mechanism 14 may be a mechanical gimbal mechanism that absorbs vibration by a mechanical configuration, or may be an electric gimbal mechanism that absorbs vibration by an electric actuator. In addition, the gimbal mechanism 14 may be a two-axis gimbal mechanism. In a case in which the gimbal mechanism 14 is a two-axis gimbal mechanism, a first axis of two axes of the gimbal mechanism 14 coincides with any one of the yaw axis, the pitch axis, or the roll axis, and a second axis of the two axes of the gimbal mechanism 14 coincides with the other of the yaw axis, the pitch axis, or the roll axis. The gimbal mechanism 14 is an example of a "gimbal mechanism" according to the technology of the present disclosure.

Figure 3:
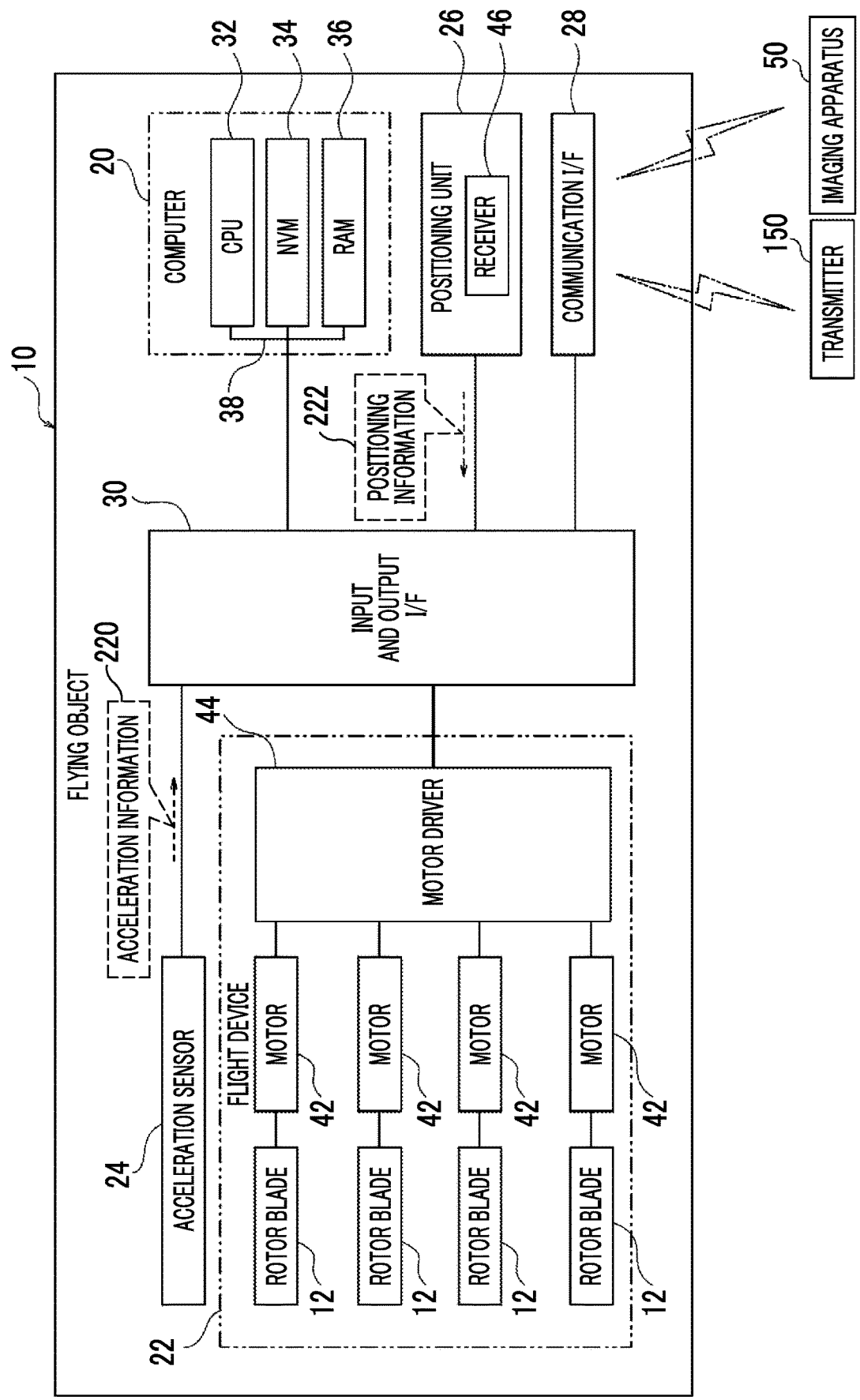
FIG. 3 is a block diagram showing an example of a hardware configuration of the flying object.

As an example, as shown in FIG. 3, the flying object 10 comprises a computer 20, a flight device 22, an acceleration sensor 24, a positioning unit 26, a communication interface (I/F) 28, and an input and output I/F 30.

The computer 20 comprises a central processing unit (CPU) 32, a non-volatile memory (NVM) 34, and a random access memory (RAM) 36. The CPU 32, the NVM 34, and the RAM 36 are connected to each other via a bus 38, and the bus 38 is connected to the input and output I/F 30.

The NVM 34 is a non-temporary storage medium, and stores various parameters and various programs. For example, the NVM 34 is a flash memory (for example, electrically erasable and programmable read only memory (EEPROM)). It should be noted that this is merely an example, and a hard disk drive (HDD) or the like may be applied as the NVM 34 together with the flash memory. The RAM 36 temporarily stores various information, and is used as a work memory.

The CPU 32 reads out a necessary program from the NVM 34 and executes the read out program on the RAM 36. The CPU 32 controls the entire flying object 10 in accordance with the program executed on the RAM 36.

The flight device 22 has the plurality of rotor blades 12, a plurality of motors 42, and a motor driver 44. In the example shown in FIG. 3, the number of the plurality of rotor blades 12 is four, as an example. The number of the plurality of motors 42 is the same as the number of the plurality of rotor blades 12. The motor driver 44 is connected to the CPU 32 via the input and output I/F 30 and the bus 38. The motor driver 44 individually controls the plurality of motors 42 in accordance with an instruction from the CPU 32. The rotor blade 12 is fixed to a rotation shaft of each motor 42. Each motor 42 rotates the rotor blade 12.

The acceleration sensor 24 detects acceleration in each axial direction of the pitch axis, the yaw axis, and the roll axis of the flying object 10. The acceleration sensor 24 outputs acceleration information 220 corresponding to the acceleration in each axial direction of the flying object 10.

The positioning unit 26 detects a position of the flying object 10. The positioning unit 26 includes a receiver 46. The receiver 46 receives, for example, position information (not shown) transmitted from a global navigation satellite system (GNSS). Examples of GNSS include a global positioning system (GPS). The positioning unit 26 detects the position of the flying object 10 based on the position information received by the receiver 46, and outputs positioning information 222 corresponding to the position of the flying object 10.

The communication I/F 28 is communicably connected to the transmitter 150 and the imaging apparatus 50. The communication I/F 28 may be communicably connected to the transmitter 150 and the imaging apparatus 50 by a predetermined wireless communication standard, or may be communicably connected to the transmitter 150 and the imaging apparatus 50 by a predetermined wired communication standard. Examples of the predetermined wireless communication standard include Bluetooth (registered trademark). It should be noted that other wireless communication standards (for example, Wi-Fi or 5G) may be used. The communication I/F 28 receives the information transmitted from the transmitter 150 to output the received information to the CPU 32 via the bus 38. In addition, the communication I/F 28 transmits the information in response to a request from the CPU 32 to the imaging apparatus 50.

Figure 4:
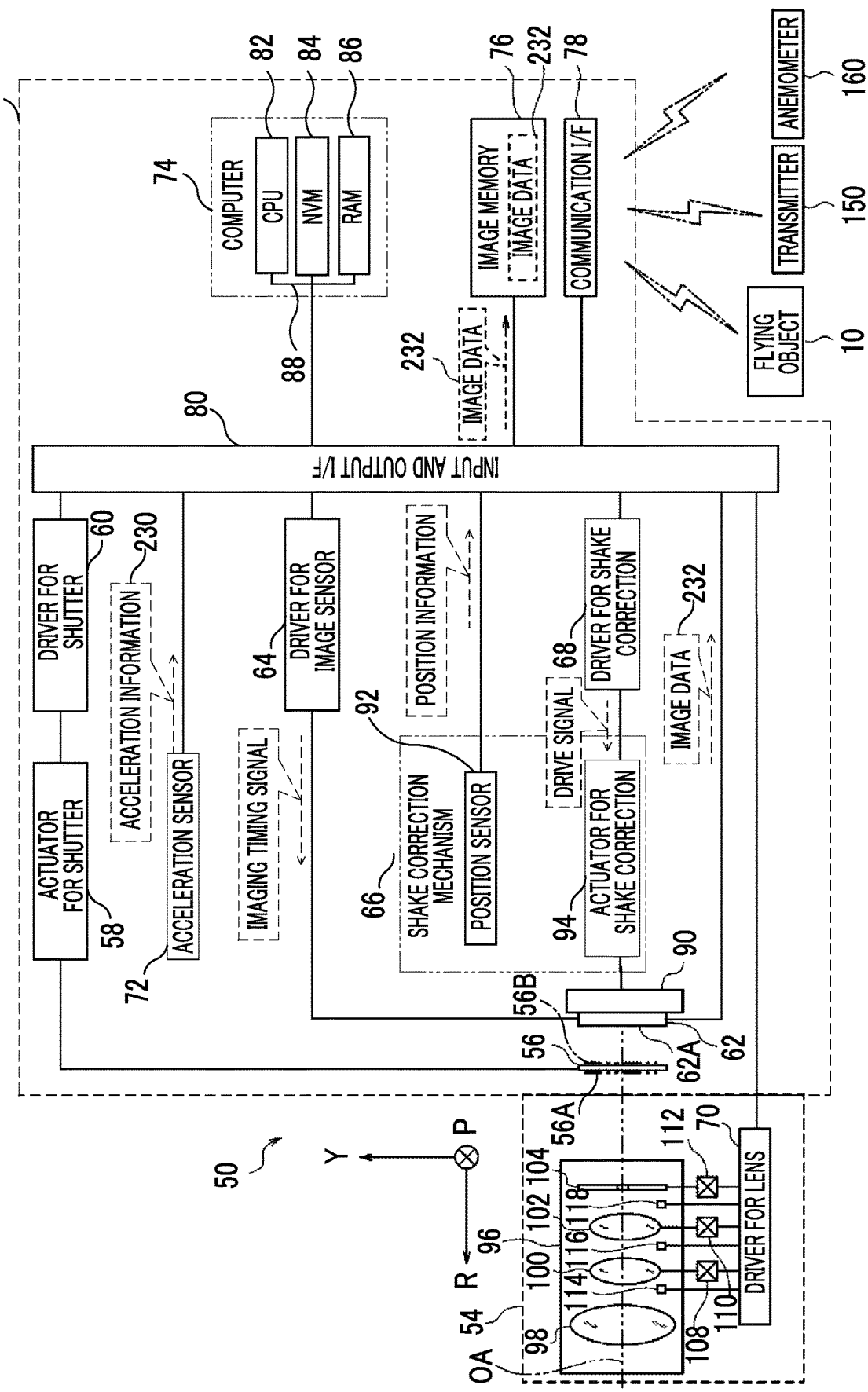
FIG. 4 is a block diagram showing an example of a hardware configuration of the imaging apparatus.

As an example, as shown in FIG. 4, the imaging apparatus 50 comprises an imaging apparatus body 52 and a lens unit 54. The imaging apparatus body 52 comprises a mechanical shutter 56, an actuator for shutter 58, a driver for shutter 60, an image sensor 62, a driver for image sensor 64, a shake correction mechanism 66, a driver for shake correction 68, a driver for lens 70, an acceleration sensor 72, a computer 74, an image memory 76, a communication I/F 78, and an input and output I/F 80.

The driver for shutter 60, the driver for image sensor 64, the driver for shake correction 68, the driver for lens 70, the acceleration sensor 72, the computer 74, the image memory 76, and the communication I/F 78 are connected to the input and output I/F 80.

The computer 74 comprises a CPU 82, an NVM 84, and a RAM 86. The CPU 82, the NVM 84, and the RAM 86 are connected via a bus 88, and the bus 88 is connected to the input and output I/F 80.

The NVM 84 is a non-temporary storage medium, and stores various parameters and various programs. For example, the NVM 84 is a flash memory (for example, EEPROM). It should be noted that this is merely an example, and an HDD or the like may be applied as the NVM 84 together with the flash memory. The RAM 86 temporarily stores various information, and is used as a work memory.

The CPU 82, which is a processor, reads out a necessary program from the NVM 84 and executes the read out program on the RAM 86. The CPU 82 controls the entire imaging apparatus 50 in accordance with the program executed on the RAM 86. In the example shown in FIG. 4, the driver for shutter 60, the driver for image sensor 64, the driver for shake correction 68, the driver for lens 70, the acceleration sensor 72, the image memory 76, and the communication I/F 78 are controlled by the CPU 82.

The image sensor 62 is a complementary metal oxide semiconductor (CMOS) image sensor, for example. Here, the CMOS image sensor is described as an example of the image sensor 62, but the technology of the present disclosure is not limited to this, and for example, the technology of the present disclosure is satisfied even in a case in which the image sensor 62 is another type of image sensor, such as a charge coupled device (CCD) image sensor.

The driver for image sensor 64 is connected to the image sensor 62. The driver for image sensor 64 supplies an imaging timing signal defining a timing of the imaging performed by the image sensor 62 to the image sensor 62 in accordance with the instruction from the CPU 82. The image sensor 62 performs resetting, exposure, and output of an electric signal in response to the imaging timing signal supplied from the driver for image sensor 64. A moving mechanism 90 is assembled to the image sensor 62, and the image sensor 62 is fixed to the moving mechanism 90. The moving mechanism 90 is, for example, a holder that supports the image sensor 62. The moving mechanism 90 is an example of a "moving mechanism" according to the technology of the present disclosure.

Subject light is incident on an imaging lens 96. The subject light is imaged on a light-receiving surface 62A of the image sensor 62 by the imaging lens 96. The image sensor 62 includes a signal processing circuit (not shown). The signal processing circuit generates digital image data 232 by digitizing analog image data, and outputs the image data 232.

The image memory 76 is an EEPROM, for example. It should be noted that this is merely an example, and an HDD, a solid state drive (SSD) or the like may be applied as the image memory 76 instead of the EEPROM or together with the EEPROM. The image data 232 generated by the image sensor 62 is stored in the image memory 76. The CPU 82 acquires the image data 232 from the image memory 76, and executes various processes using the acquired image data 232.

The mechanical shutter 56 is, for example, a focal plane shutter, and is disposed between a stop 104 and the light-receiving surface 62A. The mechanical shutter 56 comprises a front curtain 56A and a rear curtain 56B. The actuator for shutter 58 opens and closes the front curtain 56A and the rear curtain 56B. It should be noted that the imaging apparatus 50 may have an electronic shutter function instead of the mechanical shutter 56.

The acceleration sensor 72 detects the acceleration in each axial direction of the pitch axis, the yaw axis, and the roll axis of the imaging apparatus 50. The acceleration sensor 72 outputs acceleration information 230 corresponding to the acceleration in each axial direction of the imaging apparatus 50.

The shake correction mechanism 66 is a mechanism that corrects the shake of the image by moving the image sensor 62 integrally with the moving mechanism 90 in a direction in which the shake of the image is corrected, in a case in which the shake is generated in the image obtained by being captured using the image sensor 62 due to the vibration of the imaging apparatus 50.

The shake correction mechanism 66 comprises a position sensor 92 and an actuator for shake correction 94. The position sensor 92 comprises, for example, a Hall element and a sensor magnet, and detects a position of the image sensor 62 in a yaw axis direction, a position in a pitch axis direction, and a position around the pitch axis of the image sensor 62. The position sensor 92 outputs position information corresponding to the position of the image sensor 62 in the yaw axis direction, the position in the pitch axis direction, and the position around the pitch axis. The yaw axis, the pitch axis, and the roll axis of the image sensor 62 coincide with the yaw axis, the pitch axis, and the roll axis of the imaging apparatus 50.

The actuator for shake correction 94 comprises, for example, a voice coil motor or a piezoelectric element, and is driven in response to a drive signal output from the driver for shake correction 68. The actuator for shake correction 94 moves the image sensor 62 in the yaw axis direction and the pitch axis direction, and rotates the image sensor 62 around the pitch axis. The driver for shake correction 68 controls the actuator for shake correction 94 in accordance with the instruction from the CPU 82. The actuator for shake correction 94 applies power to the moving mechanism 90. The moving mechanism 90 moves the image sensor 62 based on the power applied from the actuator for shake correction 94. A movable range of the image sensor 62 and the moving mechanism 90 is limited by a movable range of the actuator for shake correction 94.

It should be noted that the "shake of the imaging apparatus 50" refers to a phenomenon in which the positional relationship between an optical axis OA of the imaging lens 96 and the light-receiving surface 62A fluctuates in the imaging apparatus 50. In a case in which the shake of the imaging apparatus 50 occurs, the shake of the image occurs. Examples of the image include an image obtained by being captured using the image sensor 62 or an optical image obtained by being imaged on the light-receiving surface 62A (hereinafter, simply "image" or "subject image").

The "shake of the image" refers to a phenomenon in which the subject image deviates from a reference position due to the tilt of the optical axis OA due to a vibration phenomenon, that is, a phenomenon in which the subject image deviates from the reference position due to the relative movement of the optical axis OA with respect to the subject. The vibration phenomenon refers to a phenomenon in which the imaging lens 96 vibrates in a case in which the vibration is transmitted to the imaging lens 96 from the outside of the imaging apparatus 50 (for example, wind or flying object 10). In addition, "tilt of the optical axis OA" means that, for example, the optical axis OA is tilted with respect to a reference axis (for example, the optical axis OA before the vibration phenomenon occurs (that is, the optical axis OA in a case in which the imaging apparatus 50 is stationary)). In addition, the "reference position" refers to, for example, the position of the subject image obtained in a state in which the vibration is not applied to the imaging lens 96 (for example, the position of the subject image in the light-receiving surface 62A).

In addition, "correcting the shake of the image" also includes bringing the position of the image shaken by the shake of the imaging apparatus 50 closer to the position of the image before the shake of the imaging apparatus 50 is generated, in addition to causing the position of the image shaken by the shake of the imaging apparatus 50 to coincide with the position of the image before the shake of the imaging apparatus 50 is generated.

The communication I/F 78 is communicably connected to the flying object 10, the transmitter 150, and the anemometer 160. The same technology as the communication I/F 28 can be applied to the communication I/F 78. The communication I/F 78 receives the information transmitted from the flying object 10 to output the received information to the CPU 82 via the bus 88. In addition, the communication I/F 78 receives the information transmitted from the transmitter 150 to output the received information to the CPU 82 via the bus 88. Further, the communication I/F 78 receives the information transmitted from the anemometer 160 to output the received information to the CPU 82 via the bus 88.

The lens unit 54 comprises the imaging lens 96. The imaging lens 96 has, for example, an objective lens 98, a focus lens 100, a zoom lens 102, and the stop 104.

In addition, the lens unit 54 comprises a driver for lens 70, a first actuator 108, a second actuator 110, a third actuator 112, a first position sensor 114, a second position sensor 116, and an aperture stop amount sensor 118. The driver for lens 70 controls the first actuator 108, the second actuator 110, and the third actuator 112 in accordance with the instruction from the CPU 82.

The first position sensor 114 detects a position of the focus lens 100 on the optical axis OA, and outputs first position information corresponding to the detected position of the focus lens 100 to the CPU 82 via the driver for lens 70. The second position sensor 116 detects a position of the zoom lens 102 on the optical axis OA, and outputs second position information corresponding to the detected position of the zoom lens 102 to the CPU 82 via the driver for lens 70. The aperture stop amount sensor 118 detects an aperture size (that is, aperture stop amount), and outputs third position information corresponding to the detected aperture size to the CPU 82 via the driver for lens 70. Examples of the first position sensor 114, the second position sensor 116, and the aperture stop amount sensor 118 include a potentiometer.

Figure 5:
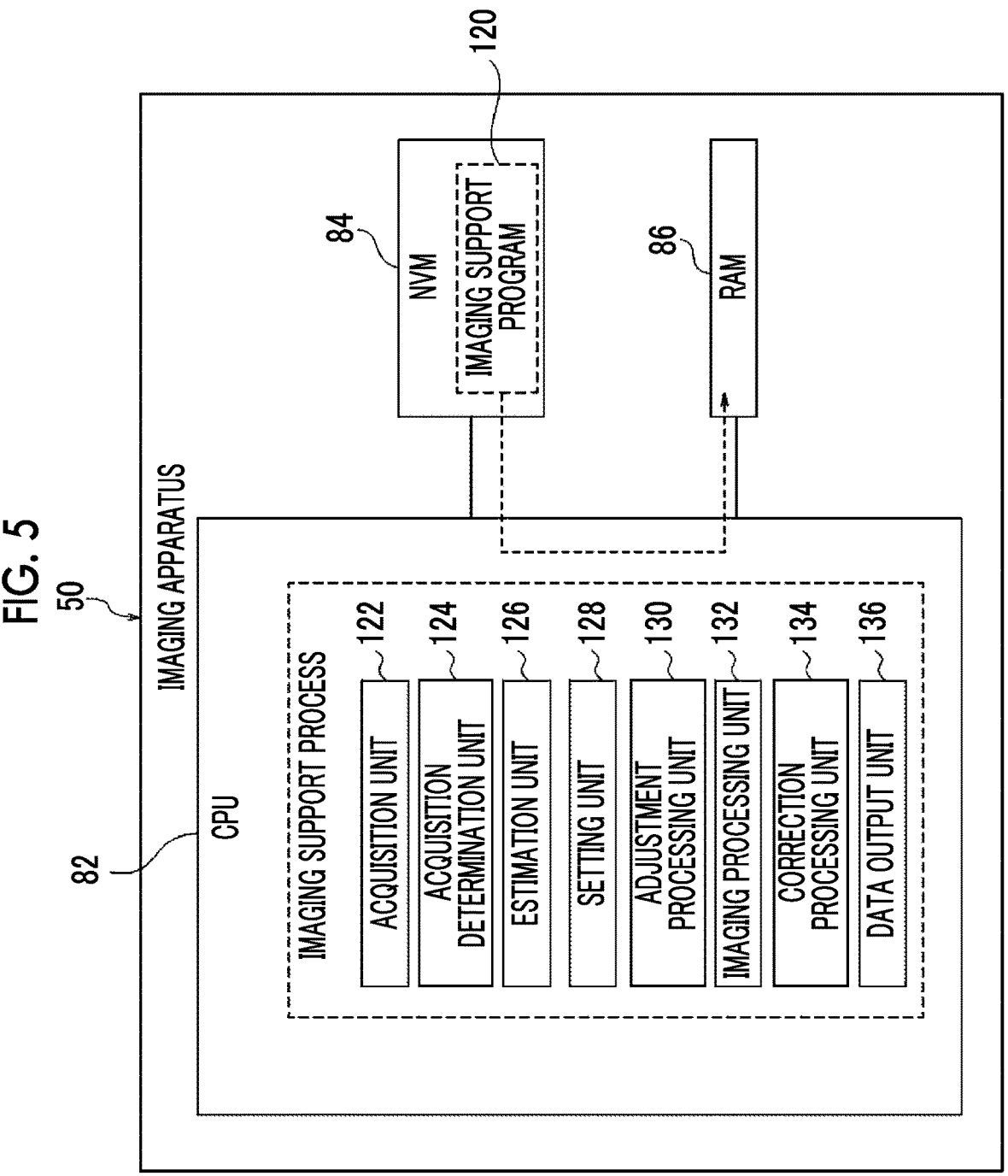
FIG. 5 is a block diagram showing an example of a functional configuration of a CPU mounted on the imaging apparatus.

As an example, as shown in FIG. 5, an imaging support program 120 is stored in the NVM 84 of the imaging apparatus 50. The imaging support program 120 is an example of a "program" according to the technology of the present disclosure. The CPU 82 reads out the imaging support program 120 from the NVM 84, and executes the read out imaging support program 120 on the RAM 86. The CPU 82 performs an imaging support process in accordance with the imaging support program 120 executed on the RAM 86. The imaging support process is executed by the CPU 82 to operate as an acquisition unit 122, an acquisition determination unit 124, an estimation unit 126, a setting unit 128, an adjustment processing unit 130, an imaging processing unit 132, a correction processing unit 134, and a data output unit 136 in accordance with the imaging support program 120.

Figure 6:
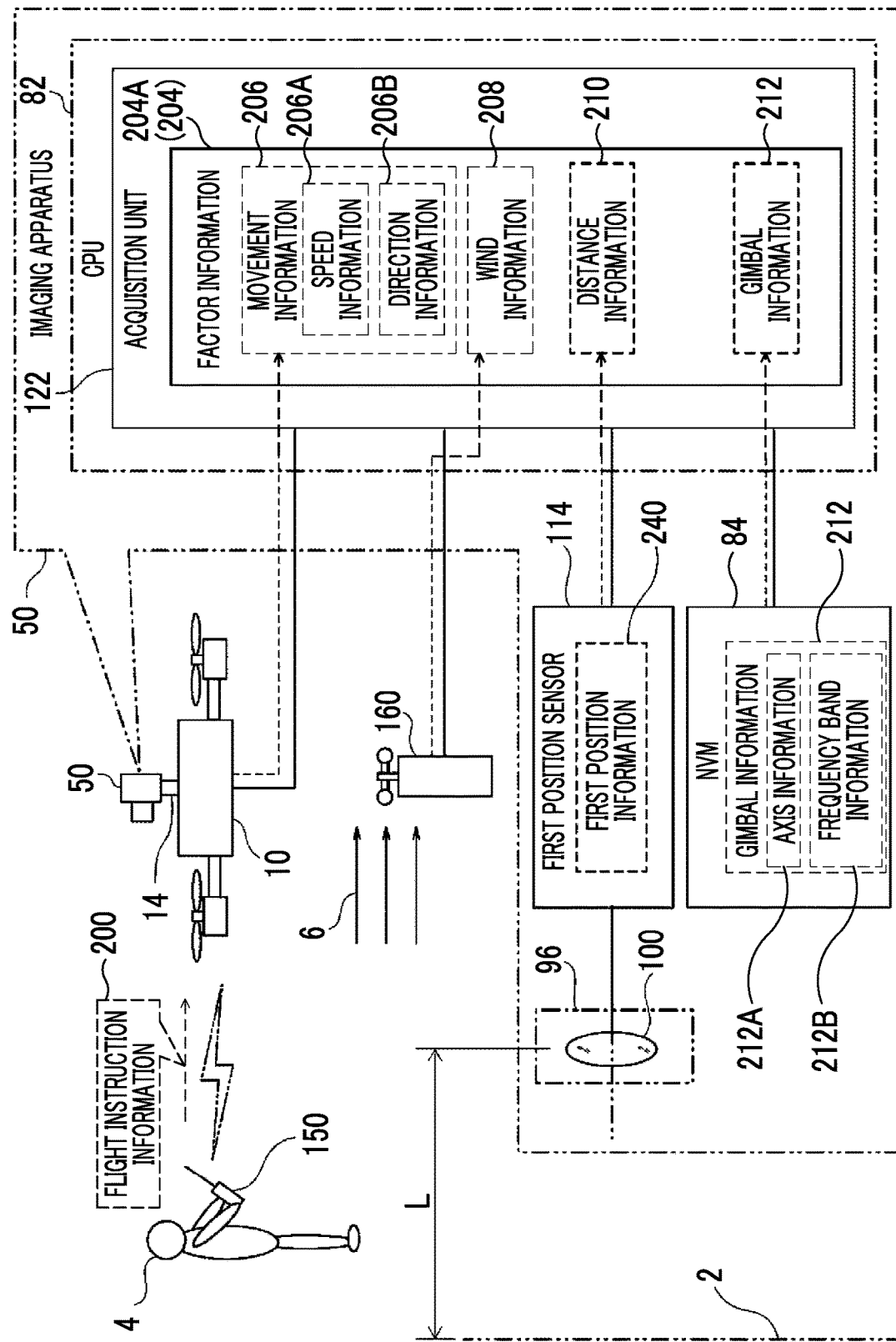
FIG. 6 is a block diagram showing an example of an operation of an acquisition unit.

As an example, as shown in FIG. 6, the acquisition unit 122 acquires factor information 204A. The factor information 204A includes movement information 206, the wind information 208, distance information 210, and gimbal information 212. The movement information 206 includes speed information 206A related to the speed at which the flying object 10 moves and direction information 206B related to the direction in which the flying object 10 moves. The wind information 208 is information related to the wind speed of the flight environment. The distance information 210 is information related to a distance L between the imaging apparatus 50 and the target object 2. The gimbal information 212 is information related to the gimbal mechanism 14. In the following manner, the acquisition unit 122 acquires the movement information 206, the wind information 208, the distance information 210, and the gimbal information 212.

The transmitter 150 transmits the flight instruction information 200 related to the speed and the direction of the flying object 10 to the flying object 10 in accordance with the instruction by the user 4. The flying object 10 transmits the received flight instruction information 200 as the movement information 206 to the imaging apparatus 50. The acquisition unit 122 acquires the movement information 206 received by the imaging apparatus 50. That is, the movement information 206 is information based on the flight instruction information 200 related to the speed and the direction input from the transmitter 150 to the flying object 10. The flight instruction information 200 is an example of "instruction information" according to the technology of the present disclosure.

The anemometer 160 detects the wind speed in the flight environment and transmits the wind information 208 corresponding to the detected wind speed to the imaging apparatus 50. The acquisition unit 122 acquires the wind information 208 received by the imaging apparatus 50. The wind information 208 is an example of "wind information" according to the technology of the present disclosure.

The first position sensor 114 detects the position of the focus lens 100 on the optical axis OA, and outputs first position information 240 corresponding to the detected position of the focus lens 100 to the CPU 82. The acquisition unit 122 acquires the distance information 210 based on the first position information 240.

Specifically, the acquisition unit 122 calculates an object distance as an example of the distance L between the imaging apparatus 50 and the target object 2. The object distance is the distance along a depth direction from a principal point of the imaging lens 96 to the subject in an in-focus state (for example, target object 2). The acquisition unit 122 calculates the object distance based on the first position information 240 indicating the position of the focus lens 100 detected by the first position sensor 114 to acquire the distance information 210 indicating the object distance. The distance information 210 is an example of "distance information" according to the technology of the present disclosure.

The gimbal information 212 is stored in advance in the NVM 84. The gimbal information 212 includes, as an example, axis information 212A and frequency band information 212B. The axis information 212A is information related to the axis of the gimbal mechanism 14. As an example, the axis information 212A is information related to the number of axes of the gimbal mechanism 14. The frequency band information 212B is information related to a frequency band that can be corrected by using the gimbal mechanism 14 with respect to the vibration transmitted from the flying object 10 to the imaging apparatus 50. It should be noted that the gimbal information 212 may not include the axis information 212A or the frequency band information 212B. The gimbal information 212 is an example of "gimbal information" according to the technology of the present disclosure.

Figure 7:
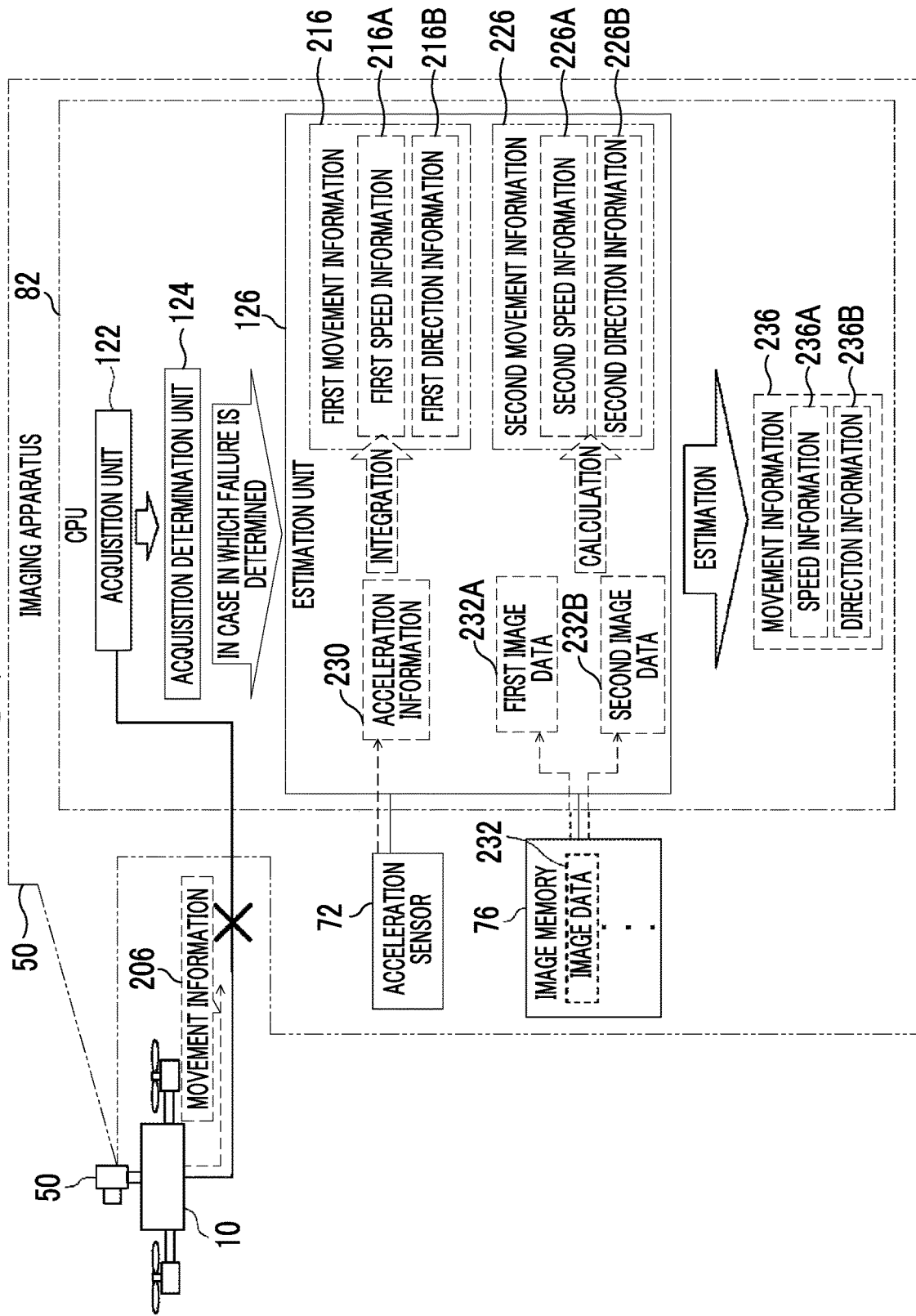
FIG. 7 is a block diagram showing an example of an operation of an estimation unit.

As an example, as shown in FIG. 7, the acquisition determination unit 124 determines whether or not the acquisition of the movement information 206 by the acquisition unit 122 is successful. For example, in a case in which the acquisition unit 122 acquires the movement information 206, and the CPU 82 obtains communication normality information (not shown) indicating that a communication state between the flying object 10 and the imaging apparatus 50 is normal, the acquisition determination unit 124 determines that the acquisition of the movement information 206 by the acquisition unit 122 is successful. On the other hand, for example, in a case in which the acquisition unit 122 acquires the movement information 206, and the CPU 82 obtains communication abnormality information (not shown) indicating that a communication state between the flying object 10 and the imaging apparatus 50 is abnormal, the acquisition determination unit 124 determines that the acquisition of the movement information 206 by the acquisition unit 122 fails. FIG. 7 shows a case in which the communication state between the flying object 10 and the imaging apparatus 50 is abnormal, and the acquisition determination unit 124 determines that the acquisition of the movement information 206 by the acquisition unit 122 fails.

In a case in which the acquisition determination unit 124 determines that the acquisition of the movement information 206 by the acquisition unit 122 fails, for example, the estimation unit 126 estimates movement information 236, which is estimation information related to the speed and the direction of the flying object 10, in the following manner.

That is, the estimation unit 126 acquires the acceleration information 230 from the acceleration sensor 72 provided in the imaging apparatus 50. Moreover, the estimation unit 126 acquires first speed information 216A related to the speed of the flying object 10 by integrating the acceleration indicated by the acceleration information 230. In addition, the estimation unit 126 acquires first direction information 216B related to the direction of the flying object 10 based on the direction of the acceleration indicated by the acceleration information 230. As a result, first movement information 216 including the first speed information 216A and the first direction information 216B is obtained.

Further, the estimation unit 126 sequentially acquires first image data 232A and second image data 232B from the image memory 76. The first image data 232A and the second image data 232B are first newest image data and second newest image data among a plurality of image data 232 recorded in the image memory 76. Moreover, the estimation unit 126 acquires second speed information 226A related to the speed of the flying object 10 based on a time interval in which the first image data 232A and the second image data 232B are recorded, and a moving distance of the flying object 10 derived based on the first image data 232A and the second image data 232B. In addition, the estimation unit 126 acquires second direction information 226B related to the direction of the flying object 10 based on the change in the position of the flying object 10 indicated by the first image data 232A and the second image data 232B. As a result, second movement information 226 including the second speed information 226A and the second direction information 226B is obtained.

Moreover, for example, the estimation unit 126 acquires speed information 236A, which is estimation information related to the speed of the flying object 10, by calculating an average value of a first speed indicated by the first speed information 216A and a second speed indicated by the second speed information 226A and the like. In addition, for example, the estimation unit 126 acquires direction information 236B, which is estimation information related to the direction of the flying object 10, by calculating an average value of an azimuthal angle in a first direction indicated by the first direction information 216B and an azimuthal angle in a second direction indicated by the second direction information 226B, and the like. In the above manner, the movement information 236, which is estimation information related to the speed and the direction of the flying object 10, is estimated.

It should be noted that the estimation unit 126 may acquire the movement information 236, which is the estimation information, based on the first movement information 216 obtained from the acceleration information 230. In addition, the estimation unit 126 may acquire the movement information 236, which is the estimation information, based on the second movement information 226 obtained from the first image data 232A and the second image data 232B. The acceleration information 230 from the acceleration sensor 72 provided in the imaging apparatus 50 is an example of "second acceleration sensor information" according to the technology of the present disclosure. The first image data 232A and the second image data 232B obtained by being captured by the image sensor 62 are examples of "second image information" according to the technology of the present disclosure. The movement information 236 estimated by the estimation unit 126 is an example of "second movement information" according to the technology of the present disclosure.

Figure 8:
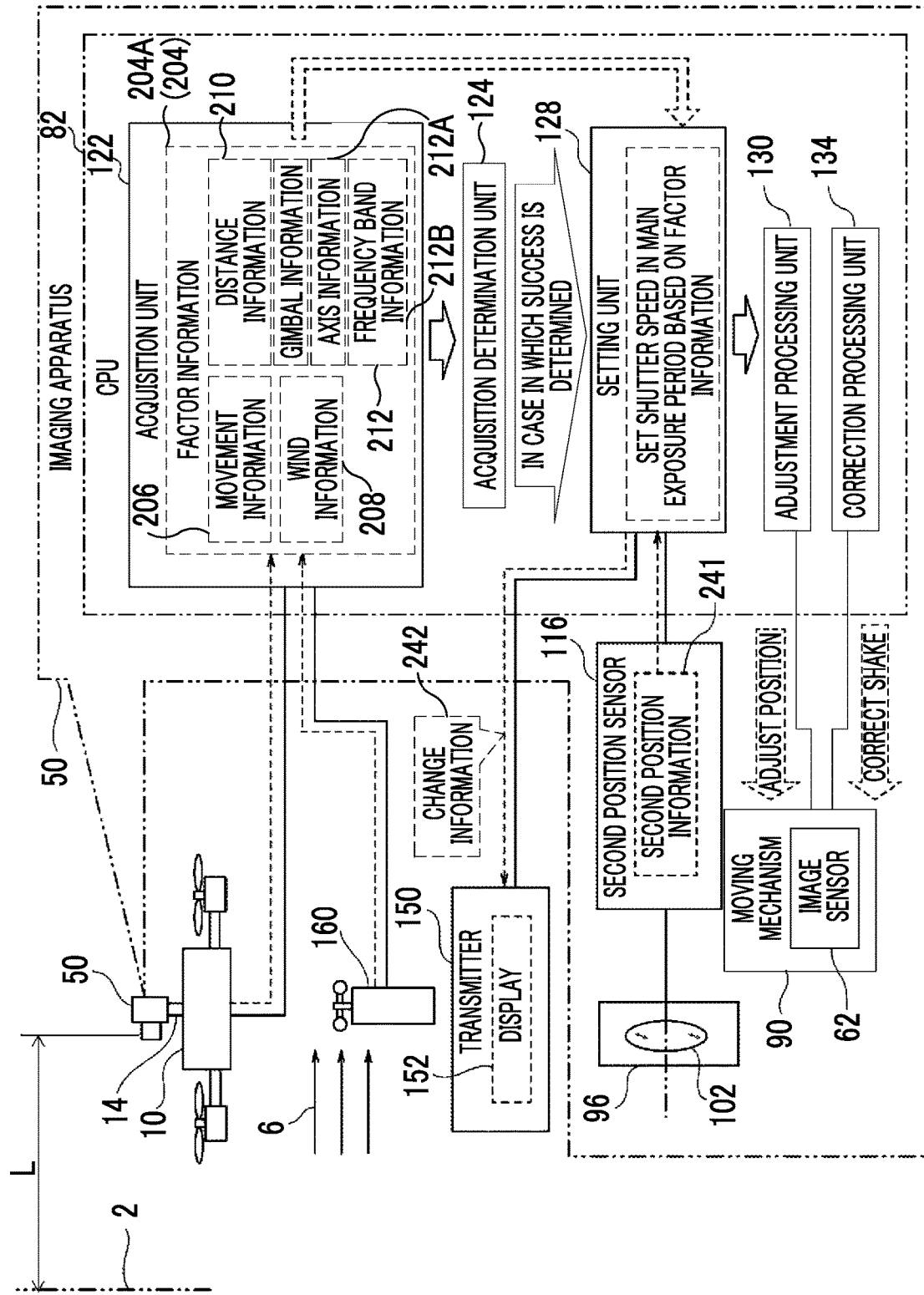
FIG. 8 is a block diagram showing an example of a first operation of a setting unit.

As an example, as shown in FIG. 8, in a case in which the acquisition determination unit 124 determines that the acquisition of the movement information 206 by the acquisition unit 122 is successful, the setting unit 128 sets the shutter speed in a main exposure period to be described below based on the factor information 204A acquired by the acquisition unit 122. As an example, the setting unit 128 changes the shutter speed set based on an imaging condition obtained from the imaging apparatus 50 based on the factor information 204A.

For example, in a case in which the moving speed of the flying object 10 indicated by the movement information 206 is equal to or higher than a predetermined speed, the setting unit 128 sets the shutter speed to a value shorter than the set value, which is set based on the imaging condition. Generally, as the moving speed of the flying object 10 is higher, the shake of the image is greater. The predetermined speed is defined as, for example, a lower limit value of a speed range in which the shake of the image cannot be corrected by using the correction processing unit 134 described below even in a case in which the position of the image sensor 62 is adjusted in advance by the adjustment processing unit 130 described below. In a case in which the moving speed of the flying object 10 is equal to or higher than the predetermined speed, the shutter speed is set to the value shorter than the set value, which is set based on the imaging condition, so that it is possible to suppress the shake of the image as compared with a case in which the shutter speed is maintained at the set value, which is set based on the imaging condition.

In addition, for example, in a case in which the object distance indicated by the distance information 210 is equal to or less than a predetermined distance, the setting unit 128 sets the shutter speed to the value shorter than the set value, which is set based on the imaging condition. In general, as the object distance is shorter, it is easier to perceive the shake of the image. The predetermined distance is defined as, for example, an upper limit value of a distance range in which the shake of the image cannot be corrected by using the correction processing unit 134 described below even in a case in which the position of the image sensor 62 is adjusted in advance by the adjustment processing unit 130 described below. In a case in which the object distance is equal to or less than the predetermined distance, the shutter speed is set to the value shorter than the set value, which is set based on the imaging condition, so that it is possible to make it difficult to perceive the shake of the image as compared with a case in which the shutter speed is maintained at the set value, which is set based on the imaging condition.

In addition, for example, in a case in which the frequency band indicated by the frequency band information 212B included in the gimbal information 212 is lower than a predetermined frequency, the setting unit 128 sets the shutter speed to the value shorter than the set value, which is set based on the imaging condition. The frequency band that can be corrected by using the correction processing unit 134, which will be described below, is a band higher than the frequency band that can be corrected by using the gimbal mechanism 14. In a case in which the frequency band that can be corrected by using the correction processing unit 134 (hereinafter, referred to as high frequency band) and the frequency band that can be corrected by using the gimbal mechanism 14 (hereinafter, referred to as low frequency band) deviate from each other, the shake of the image in an intermediate frequency band between the high frequency band and the low frequency band is larger than a case in which the high frequency band and the low frequency band are continuous. The predetermined frequency is defined by, for example, the lower limit value described above of the high frequency band. In a case in which the frequency band indicated by the frequency band information 212B included in the gimbal information 212 is lower than the predetermined frequency, the shutter speed is set to the value shorter than the set value, which is set based on the imaging condition, so that it is possible to suppress the shake of the image as compared with a case in which the shutter speed is maintained at the set value, which is set based on the imaging condition.

In addition, for example, in a case in which the number of axes of the gimbal mechanism 14 indicated by the axis information 212A included in the gimbal information 212 is less than a predetermined number, the setting unit 128 sets the shutter speed to the value shorter than the set value, which is set based on the imaging condition. Generally, as the number of axes of the gimbal mechanism 14 is decreased, the vibration absorption performance of the gimbal mechanism 14 is decreased, so that the shake of the image is increased. The predetermined number is set to 3, for example, which corresponds to the three-axis gimbal mechanism. In a case in which the number of axes of the gimbal mechanism 14 is less than the predetermined number, the shutter speed is set to the value shorter than the set value, which is set based on the imaging condition, so that it is possible to suppress the shake of the image as compared with a case in which the shutter speed is maintained at the set value, which is set based on the imaging condition.

In addition, for example, in a case in which the wind speed indicated by the wind information 208 is equal to or higher than a predetermined wind speed, the setting unit 128 sets the shutter speed to the value shorter than the set value, which is set based on the imaging condition. Generally, as the wind speed in the flight environment is higher, the vibration generated in the flying object 10 is stronger, and the shake of the image is greater. The predetermined wind speed is defined as, for example, a lower limit value of a wind speed range in which the shake of the image cannot be corrected by using the correction processing unit 134 described below even in a case in which the position of the image sensor 62 is adjusted in advance by the adjustment processing unit 130 described below. In a case in which the wind speed in the flight environment is equal to or higher than the predetermined wind speed, the shutter speed is set to the value shorter than the set value, which is set based on the imaging condition, so that it is possible to suppress the shake of the image as compared with a case in which the shutter speed is maintained at the set value, which is set based on the imaging condition.

It should be noted that the setting unit 128 may calculate a focal length of the imaging lens 96 based on the second position information 241 indicating the position of the zoom lens 102 detected by the second position sensor 116, and may make the shutter speed shorter than the set value, which is set based on the imaging condition in a case in which the focal length is equal to or larger than a predetermined focal length. In general, as the focal length is longer (that is, a distance is larger), it is easier to perceive the shake of the image. The predetermined focal length is defined as, for example, a lower limit value of a focal length range in which the shake of the image cannot be corrected by using the correction processing unit 134 described below even in a case in which the position of the image sensor 62 is adjusted in advance by the adjustment processing unit 130 described below. In a case in which the focal length is equal to or larger than the predetermined focal length, the shutter speed is set to the value shorter than the set value, which is set based on the imaging condition, so that it is possible to make it difficult to perceive the shake of the image as compared with a case in which the shutter speed is maintained at the set value, which is set based on the imaging condition.

In addition, in a case in which the shutter speed is changed by the setting unit 128, change information 242 indicating that the shutter speed is changed may be transmitted to the transmitter 150. Moreover, on a display 152 of the transmitter 150, characters or the like indicating that the change or an error may occur may be displayed based on the change information 242.

Figure 9:
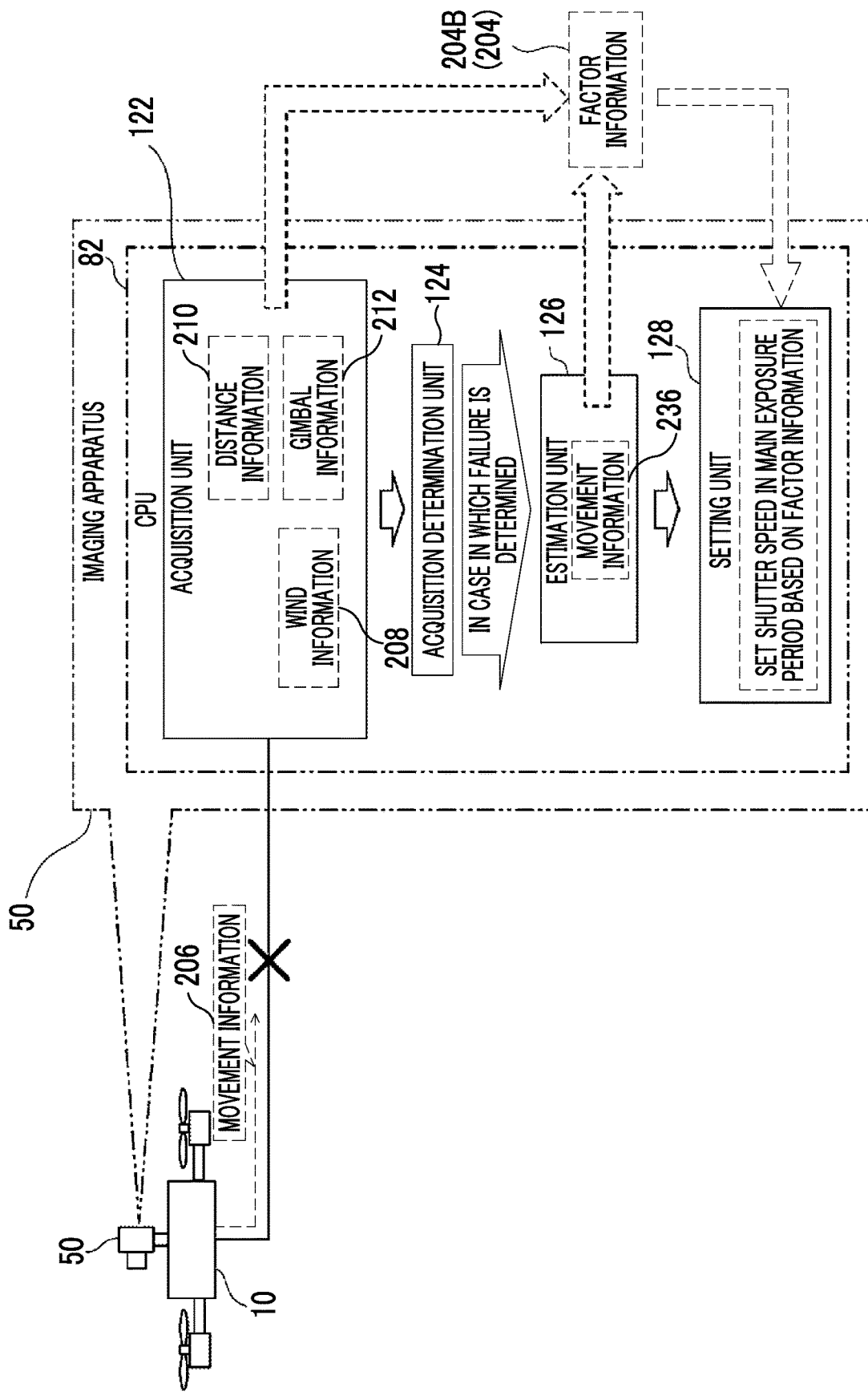
FIG. 9 is a block diagram showing an example of a second operation of the setting unit.

As an example, as shown in FIG. 9, in a case in which the acquisition determination unit 124 determines that the acquisition of the movement information 206 by the acquisition unit 122 fails, the setting unit 128 sets the shutter speed in the main exposure period to be described below based on factor information 204B in which the movement information 236 estimated by the estimation unit 126 is added to the distance information 210, the wind information 208, and the gimbal information 212 acquired by the acquisition unit 122. In a case in which the acquisition determination unit 124 determines that the acquisition of the movement information 206 by the acquisition unit 122 fails, the setting unit 128 sets the shutter speed in the main exposure period based on the factor information 204B in the same manner as in a case in which the acquisition determination unit 124 determines that the acquisition of the movement information 206 by the acquisition unit 122 is successful (see FIG. 8). It should be noted that, in a case in which it is not necessary to distinguish between the factor information 204A (see FIG. 8) and the factor information 204B (see FIG. 9), the factor information 204A and the factor information 204B are referred to as factor information 204, respectively.

Figure 10:
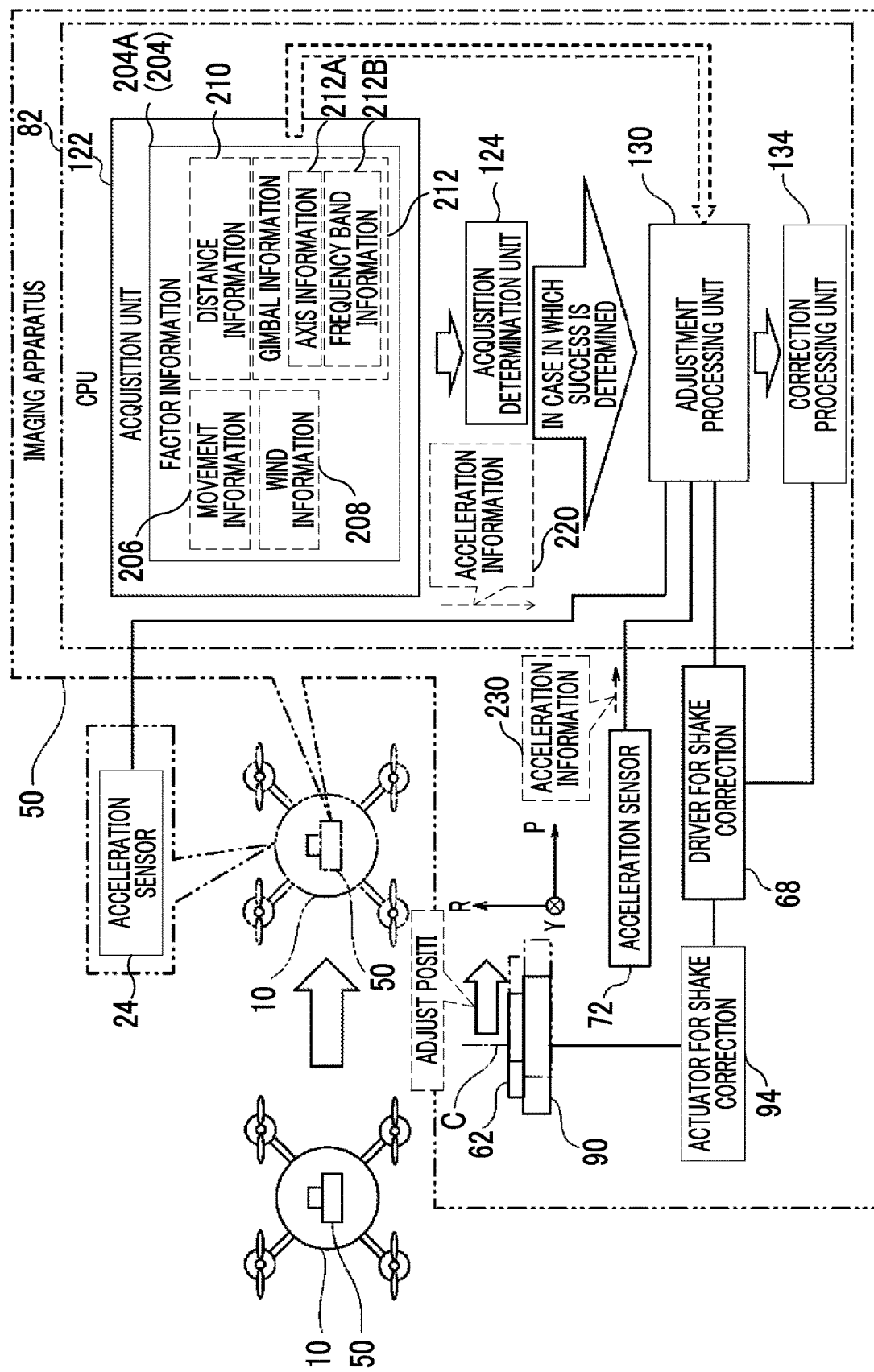
FIG. 10 is a block diagram showing an example of a first operation of an adjustment processing unit.

As an example, as shown in FIG. 10, the adjustment processing unit 130 adjusts the position of the moving mechanism 90 that moves the image sensor 62 by controlling the actuator for shake correction 94 via the driver for shake correction 68. The position of the image sensor 62 is adjusted by adjusting the position of the moving mechanism 90. As an example, in a case in which the acquisition determination unit 124 determines that the acquisition of the movement information 206 by the acquisition unit 122 is successful, the adjustment processing unit 130 adjusts the position of the moving mechanism 90 based on the factor information 204A acquired by the acquisition unit 122.

The adjustment processing unit 130 adjusts the position of the moving mechanism 90 based on the direction indicated by the movement information 206 (that is, the direction in which the flying object 10 moves). For example, in a case in which the flying object 10 moves along the pitch axis, the adjustment processing unit 130 adjusts the position of the moving mechanism 90 in the same direction as the direction in which the flying object 10 moves along the pitch axis. In addition, for example, in a case in which the flying object 10 moves along the yaw axis, the adjustment processing unit 130 adjusts the position of the moving mechanism 90 in the same direction as the direction in which the flying object 10 moves along the yaw axis. As an example, FIG. 10 shows a state in which the position of the moving mechanism 90 is adjusted in the same direction as the direction in which the flying object 10 moves along the pitch axis in accordance with the movement of the flying object 10 along the pitch axis.

It should be noted that, in a case in which the moving direction of the flying object 10 is a direction tilted with the pitch axis in a plan view, the adjustment processing unit 130 adjusts the position of the moving mechanism 90 in the same direction as a movement component of the flying object 10 in the pitch axis direction. In addition, in a case in which the moving direction of the flying object 10 is a direction tilted with the yaw axis and the pitch axis in a front view, the adjustment processing unit 130 adjusts the position of the moving mechanism 90 in the same direction as the movement component of the flying object 10 in the yaw axis direction and the same direction as the movement component of the flying object 10 in the pitch axis direction.

The adjustment processing unit 130 adjusts the position of the moving mechanism 90 with respect to a central axis C of the image sensor 62. The central axis C of the image sensor 62 is an axis passing through a center of the image sensor 62 in a state before the position of the moving mechanism 90 is adjusted by the adjustment processing unit 130 and the correction processing unit 134.

As an example, the adjustment processing unit 130 changes an amount of adjusting the position of the moving mechanism 90 (hereinafter, referred to as position adjustment amount) based on the factor information 204A. The position adjustment amount of the moving mechanism 90 corresponds to a change amount of the position of the moving mechanism 90 with respect to the central axis.

For example, the adjustment processing unit 130 sets a larger position adjustment amount of the moving mechanism 90 as the moving speed of the flying object 10 indicated by the movement information 206 is higher. Generally, as the moving speed of the flying object 10 is higher, the moving distance of the flying object 10 that moves in the main exposure period is longer. By setting a larger position adjustment amount of the moving mechanism 90 as the moving speed of the flying object 10 indicated by the movement information 206 is higher, a movable distance (hereinafter, referred to as shake correction distance) of the image sensor 62 in a direction opposite to the direction in which the flying object 10 moves in the main exposure period is increased. As a result, the shake correction distance in accordance with the moving speed of the flying object 10 is secured.

In addition, for example, the adjustment processing unit 130 sets a larger position adjustment amount of the moving mechanism 90 as the object distance indicated by the distance information 210 is shorter. Generally, as the object distance is shorter, the distance in which the subject moves relative to the imaging apparatus 50 in the main exposure period is longer. By setting a larger position adjustment amount of the moving mechanism 90 as the object distance indicated by the distance information 210 is shorter, the shake correction distance of the image sensor 62 in the main exposure period is increased. As a result, the shake correction distance in accordance with the object distance is secured.

In addition, for example, in a case in which the frequency band indicated by the frequency band information 212B included in the gimbal information 212 is lower than the predetermined frequency, the adjustment processing unit 130 sets a larger position adjustment amount of the moving mechanism 90 than a case in which the frequency band is equal to or higher than the predetermined frequency. As described above, in a case in which the high frequency band that can be corrected by using the correction processing unit 134 and the low frequency band that can be corrected by using the gimbal mechanism 14 deviate from each other, the shake of the image in an intermediate frequency band between the high frequency band and the low frequency band is larger than a case in which the high frequency band and the low frequency band are continuous. In a case in which the frequency band indicated by the frequency band information 212B included in the gimbal information 212 is lower than the predetermined frequency, by setting a larger position adjustment amount of the moving mechanism 90 than a case in which the frequency band is equal to or higher than the predetermined frequency, the shake correction distance of the image sensor 62 in the main exposure period is longer than a case in which the frequency band is equal to or higher than the predetermined frequency. As a result, the shake correction distance in accordance with the vibration absorption performance of the gimbal mechanism 14 is secured.

In addition, for example, in a case in which the number of axes of the gimbal mechanism 14 indicated by the axis information 212A included in the gimbal information 212 is less than the predetermined number, the adjustment processing unit 130 sets a larger position adjustment amount of the moving mechanism 90 than a case in which the number of axes of the gimbal mechanism 14 is equal to or larger than the predetermined number. As described above, as the number of axes of the gimbal mechanism 14 is decreased, the vibration absorption performance of the gimbal mechanism 14 is decreased, so that the shake of the image is increased. In a case in which the number of axes of the gimbal mechanism 14 indicated by the axis information 212A included in the gimbal information 212 is less than the predetermined number, the shake correction distance of the image sensor 62 in the main exposure period is longer than a case in which the number of axes of the gimbal mechanism 14 is equal to or larger than the predetermined number. As a result, the shake correction distance in accordance with the vibration absorption performance of the gimbal mechanism 14 is secured.

In addition, for example, the adjustment processing unit 130 sets a larger position adjustment amount of the moving mechanism 90 as the wind speed indicated by the wind information 208 is higher. Generally, as the wind speed in the flight environment is higher, the vibration generated in the flying object 10 is stronger, and the shake of the image is greater. By setting a larger position adjustment amount of the moving mechanism 90 as the wind speed indicated by the wind information 208 is higher, the shake correction distance of the image sensor 62 in the main exposure period is increased. As a result, the shake correction distance in accordance with the wind speed of the flight environment is secured.

It should be noted that, for example, the adjustment processing unit 130 may set a larger position adjustment amount of the moving mechanism 90 as the acceleration indicated by the acceleration information 220 from the acceleration sensor 24 provided in the flying object 10 is higher. In general, as the acceleration acting on the flying object 10 is higher, the vibration generated in the flying object 10 is stronger, and the shake of the image is greater. By setting a larger position adjustment amount of the moving mechanism 90 as the acceleration indicated by the acceleration information 220 is higher, the shake correction distance of the image sensor 62 in the main exposure period is increased. As a result, a shake correction distance in accordance with the acceleration acting on the flying object 10 is secured.

Similarly, for example, the adjustment processing unit 130 may set a larger position adjustment amount of the moving mechanism 90 as the acceleration indicated by the acceleration information 230 from the acceleration sensor 72 provided in the imaging apparatus 50 is higher.

In addition, the adjustment processing unit 130 may acquire wind direction information (not shown) related to a direction of the wind 6 generated in the flight environment, and may change the position adjustment amount of the moving mechanism 90 based on the acquired wind direction information.

In addition, the adjustment processing unit 130 may adjust the position of the moving mechanism 90 such that the image sensor 62 moves to an end of the movable range regardless of the factor information 204.

In a case in which the position of the moving mechanism 90 is adjusted by the adjustment processing unit 130 as described above, the position of the moving mechanism 90 is maintained until a correction process by the correction processing unit 134 described below is executed.

Figure 11:
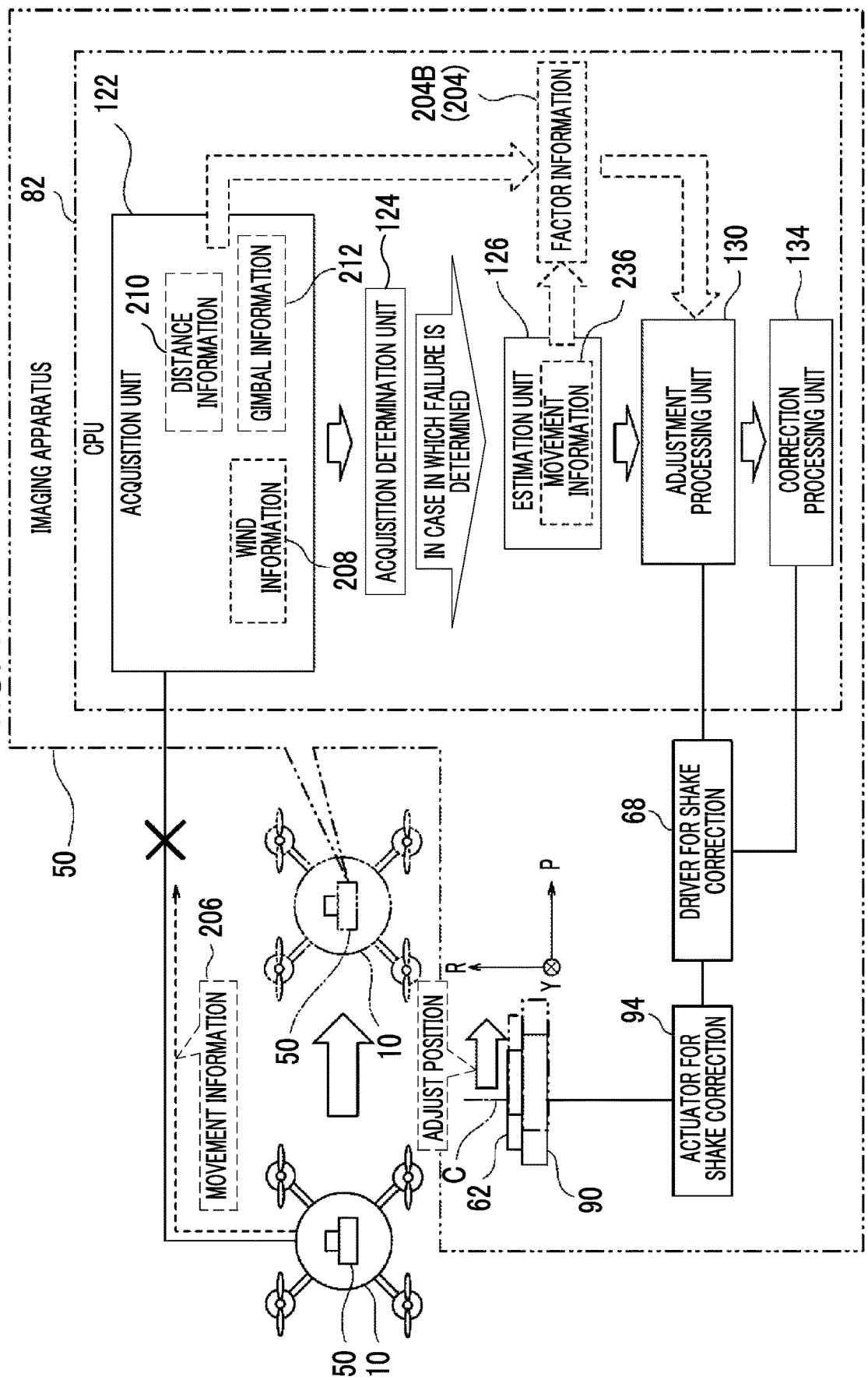
FIG. 11 is a block diagram showing an example of a second operation of the adjustment processing unit.

As an example, as shown in FIG. 11, in a case in which the acquisition determination unit 124 determines that the acquisition of the movement information 206 by the acquisition unit 122 fails, the adjustment processing unit 130 adjusts the position of the moving mechanism 90 based on factor information 204B in which the movement information 236 estimated by the estimation unit 126 is added to the distance information 210, the wind information 208, and the gimbal information 212 acquired by the acquisition unit 122. In a case in which the acquisition determination unit 124 determines that the acquisition of the movement information 206 by the acquisition unit 122 fails, the adjustment processing unit 130 adjusts the position of the moving mechanism 90 based on the factor information 204B in the same manner as in a case in which the acquisition determination unit 124 determines that the acquisition of the movement information 206 by the acquisition unit 122 is successful (see FIG. 10).

Figure 12:
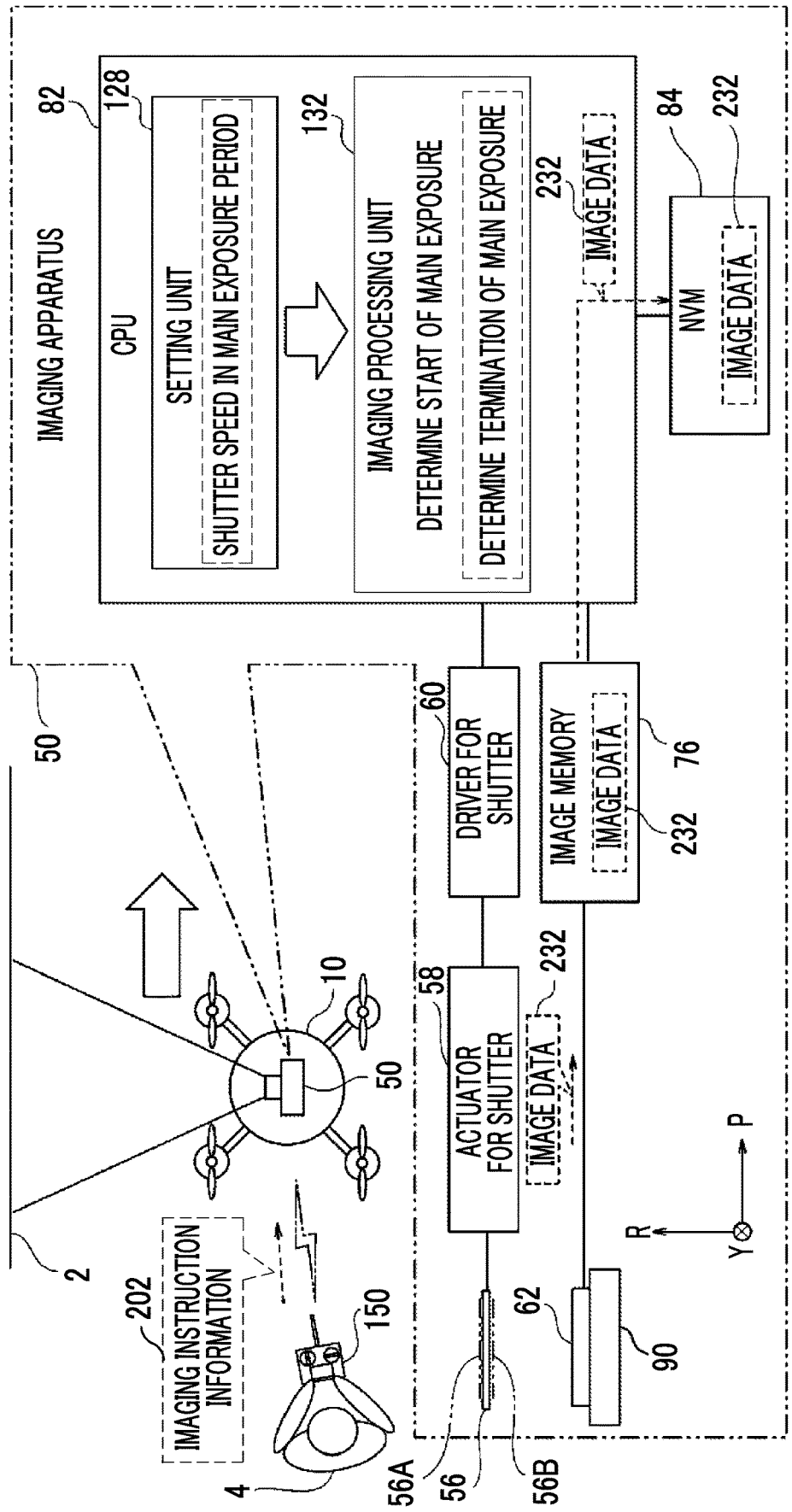
FIG. 12 is a block diagram showing an example of an operation of an imaging processing unit.

As an example, as shown in FIG. 12, the imaging instruction information 202 transmitted from the transmitter 150 is received by the imaging apparatus 50. In a case in which the imaging instruction information 202 is received by the imaging apparatus 50, the CPU 82 of the imaging apparatus 50 controls the actuator for shutter 58 via the driver for shutter 60 to open or close the front curtain 56A and open or close the rear curtain 56B to execute the main exposure. In this case, the CPU 82 executes the main exposure based on the shutter speed set by the setting unit 128. In a case in which the main exposure is executed, the image sensor 62 images the target object 2 to generate the image data 232 for one frame. The image data 232 generated by the image sensor 62 is stored in the image memory 76.

The CPU 82 acquires the image data 232 from the image memory 76, and executes various processes on the acquired image data 232. Moreover, the CPU 82 records the image data 232 subjected to various processes in the NVM 84. It should be noted that, in a case in which a memory card (not shown) is connected to the imaging apparatus 50, the CPU 82 may record the image data 232 subjected to various processes in the memory card.

The imaging processing unit 132 determines whether or not the main exposure is started. In a case in which the CPU 82 starts the main exposure, the imaging processing unit 132 determines that the main exposure is started. In addition, the imaging processing unit 132 determines whether or not the main exposure is terminated. In a case in which the CPU 82 terminates the main exposure, the imaging processing unit 132 determines that the main exposure is terminated.

Figure 13:
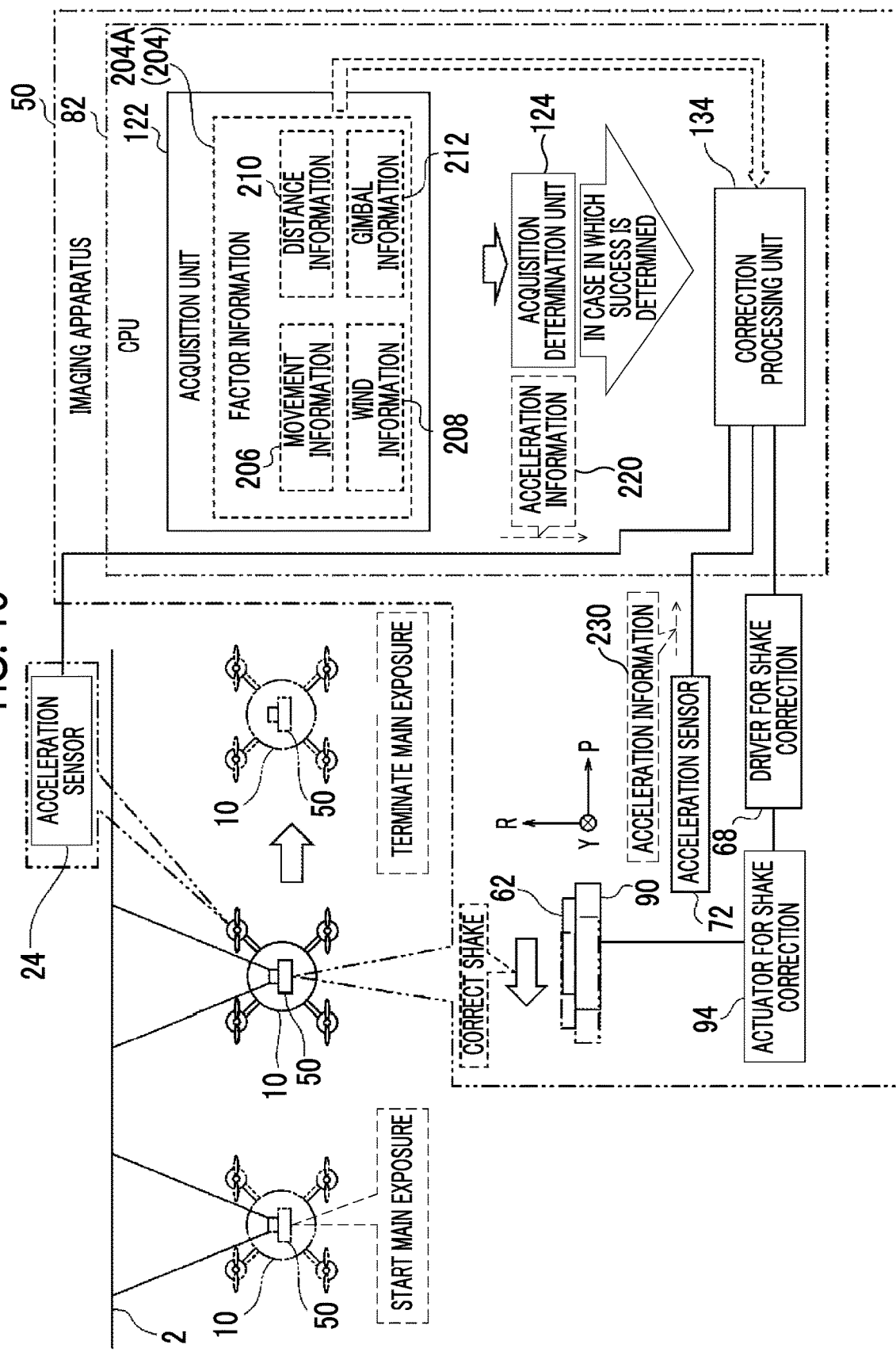
FIG. 13 is a block diagram showing an example of a first operation of a correction processing unit.

As an example, as shown in FIG. 13, the correction processing unit 134 performs a process of correcting the shake of the image (hereinafter, referred to as correction process) in a case in which the main exposure is executed. Stated another way, the correction processing unit 134 performs the correction process such that the shake of the image is corrected together with the main exposure. The correction processing unit 134 starts the correction process in a case in which the imaging processing unit 132 determines that the main exposure is started, and terminates the correction process in a case in which the imaging processing unit 132 determines that the main exposure is terminated. A period in which the correction process is performed may overlap with the entire period of the main exposure, or may overlap with a partial period of the main exposure.

The correction processing unit 134 corrects the shake applied to the image sensor 62 by using the moving mechanism 90 as the correction process. That is, the correction processing unit 134 controls the actuator for shake correction 94 via the driver for shake correction 68 to move the image sensor 62 in the direction in which the shake of the image is corrected. As an example, in a case in which the acquisition determination unit 124 determines that the acquisition of the movement information 206 by the acquisition unit 122 is successful, the correction processing unit 134 moves the image sensor 62 in the direction in which the shake of the image is corrected, based on the factor information 204A acquired by the acquisition unit 122.

The correction processing unit 134 moves the image sensor 62 based on the direction indicated by the movement information 206. For example, in a case in which the flying object 10 moves along the pitch axis, the correction processing unit 134 moves the image sensor 62 in a direction opposite to the direction in which the flying object 10 moves along the pitch axis. In addition, for example, in a case in which the flying object 10 moves along the yaw axis, the correction processing unit 134 moves the image sensor 62 in a direction opposite to the direction in which the flying object 10 moves along the yaw axis. As an example, FIG. 13 shows a state in which the image sensor 62 moves in the direction opposite to the direction in which the flying object 10 moves along the pitch axis in accordance with the movement of the flying object 10 along the pitch axis.

It should be noted that, in a case in which the moving direction of the flying object 10 is the direction tilted with the pitch axis in a plan view, the correction processing unit 134 moves the image sensor 62 in the direction opposite to the movement component of the flying object 10 in the pitch axis direction. In addition, in a case in which the moving direction of the flying object 10 is the direction tilted with the yaw axis and the pitch axis in a front view, the correction processing unit 134 moves the image sensor 62 in a direction opposite to the movement component of the flying object 10 in the yaw axis direction and a direction opposite to the movement component of the flying object 10 in the pitch axis direction.

In addition, for example, in a case in which the correction processing unit 134 moves the image sensor 62 based on the direction indicated by the movement information 206, the correction processing unit 134 acquires the acceleration information 230 from the acceleration sensor 72 provided in the imaging apparatus 50 and calculates a shake amount of the imaging apparatus 50 based on the acceleration information 230. Moreover, the correction processing unit 134 adjusts the direction and the moving amount in which the image sensor 62 moves based on the shake amount of the imaging apparatus 50.

It should be noted that the correction processing unit 134 may acquire the acceleration information 220 from the acceleration sensor 24 provided in the flying object 10 and may calculate the shake amount of the flying object 10 based on the acceleration information 220. Moreover, the correction processing unit 134 may adjust the moving direction and the moving amount in which the image sensor 62 moves based on the shake amount of the flying object 10.

In addition, in a case in which the image sensor 62 is moved based on the direction indicated by the movement information 206, the correction processing unit 134 may calculate the shake amount of the imaging apparatus 50 based on the distance information 210, the wind information 208, or the gimbal information 212, and the acceleration information 230, and may adjust the direction and the moving amount in which the image sensor 62 moves based on the calculated shake amount of the imaging apparatus 50.

In addition, the correction processing unit 134 may acquire the wind direction information (not shown) related to the wind direction of the flight environment in a case in which the image sensor 62 is moved based on the direction indicated by the movement information 206. Moreover, the correction processing unit 134 calculates the shake amount of the imaging apparatus 50 based on the wind direction information, the wind information 208, and the acceleration information 230, and may adjust the direction and the moving amount in which the image sensor 62 moves based on the calculated shake amount of the imaging apparatus 50.

Figure 14:
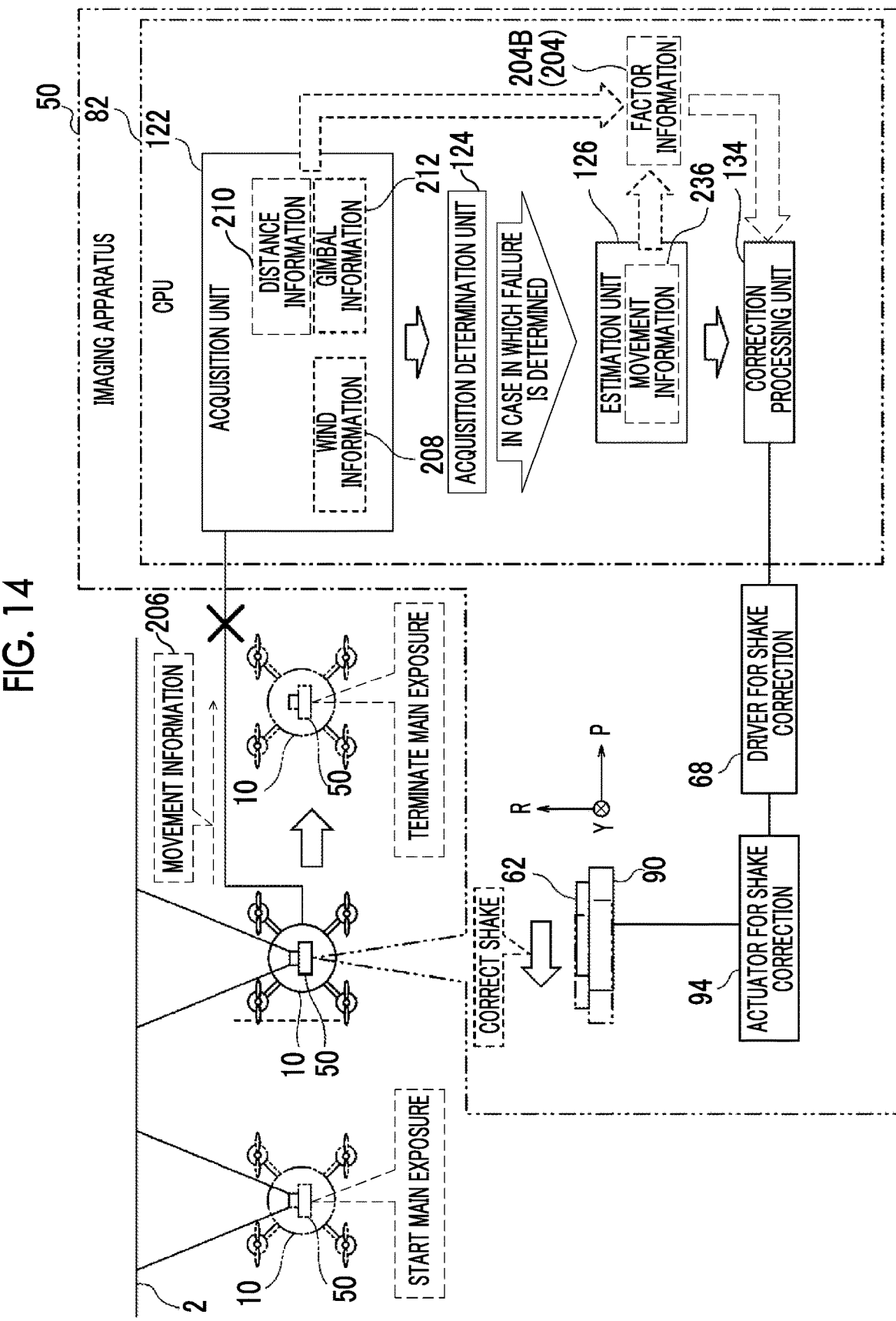
FIG. 14 is a block diagram showing an example of a second operation of the correction processing unit.

As an example, as shown in FIG. 14, in a case in which the acquisition determination unit 124 determines that the acquisition of the movement information 206 by the acquisition unit 122 fails, the correction processing unit 134 moves the image sensor 62 in the direction in which the shake of the image is corrected, based on factor information 204B in which the movement information 236 estimated by the estimation unit 126 is added to the distance information 210, the wind information 208, and the gimbal information 212 acquired by the acquisition unit 122. In a case in which the acquisition determination unit 124 determines that the acquisition of the movement information 206 by the acquisition unit 122 fails, the correction processing unit 134 moves the image sensor 62 in the direction in which the shake of the image is corrected, based on the factor information 204B in the same manner as in a case in which the acquisition determination unit 124 determines that the acquisition of the movement information 206 by the acquisition unit 122 is successful (see FIG. 13).

Figure 15:
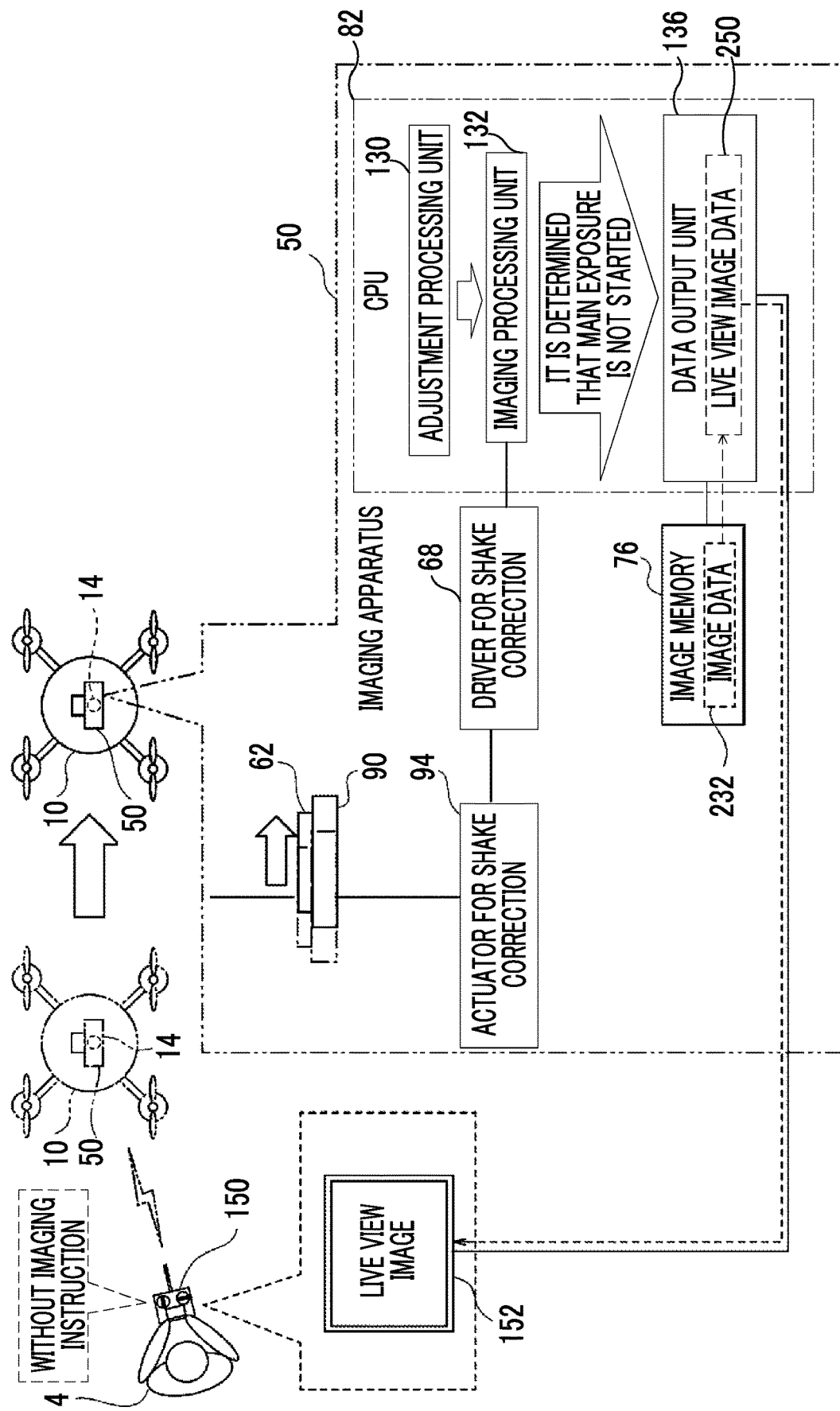
FIG. 15 is a block diagram showing an example of an operation of a data output unit.

As an example, as shown in FIG. 15, in a case in which the transmitter 150 does not receive the imaging instruction from the user 4, the imaging instruction information (not shown) is not transmitted from the transmitter 150 to the imaging apparatus 50. In this case, the imaging processing unit 132 determines that the main exposure is not started.

In a case in which the imaging processing unit 132 determines that the main exposure is not started, the data output unit 136 generates live view image data 250 based on the image data 232 stored in the image memory 76.

The transmitter 150 comprises a display 152, and the data output unit 136 outputs the generated live view image data 250 to the display 152. The display 152 displays a live view image based on the live view image data 250. The display 152 is an example of a "display device" according to the technology of the present disclosure.

In a case in which a data output process by the data output unit 136 is executed in this way, the shake applied to the imaging apparatus 50 is corrected by using the gimbal mechanism 14. In addition, in a case in which the data output unit 136 executes a generation process and an output process of the live view image data 250, the position of the moving mechanism 90 is maintained by the control by the driver for shake correction 68.

It should be noted that, in a case in which the data output process by the data output unit 136 is executed, the shake of the image may be corrected by electronic image stabilization (EIS). In addition, the live view image data 250 may be output to a display device other than the display 152 provided in the transmitter 150.

Figure 16:
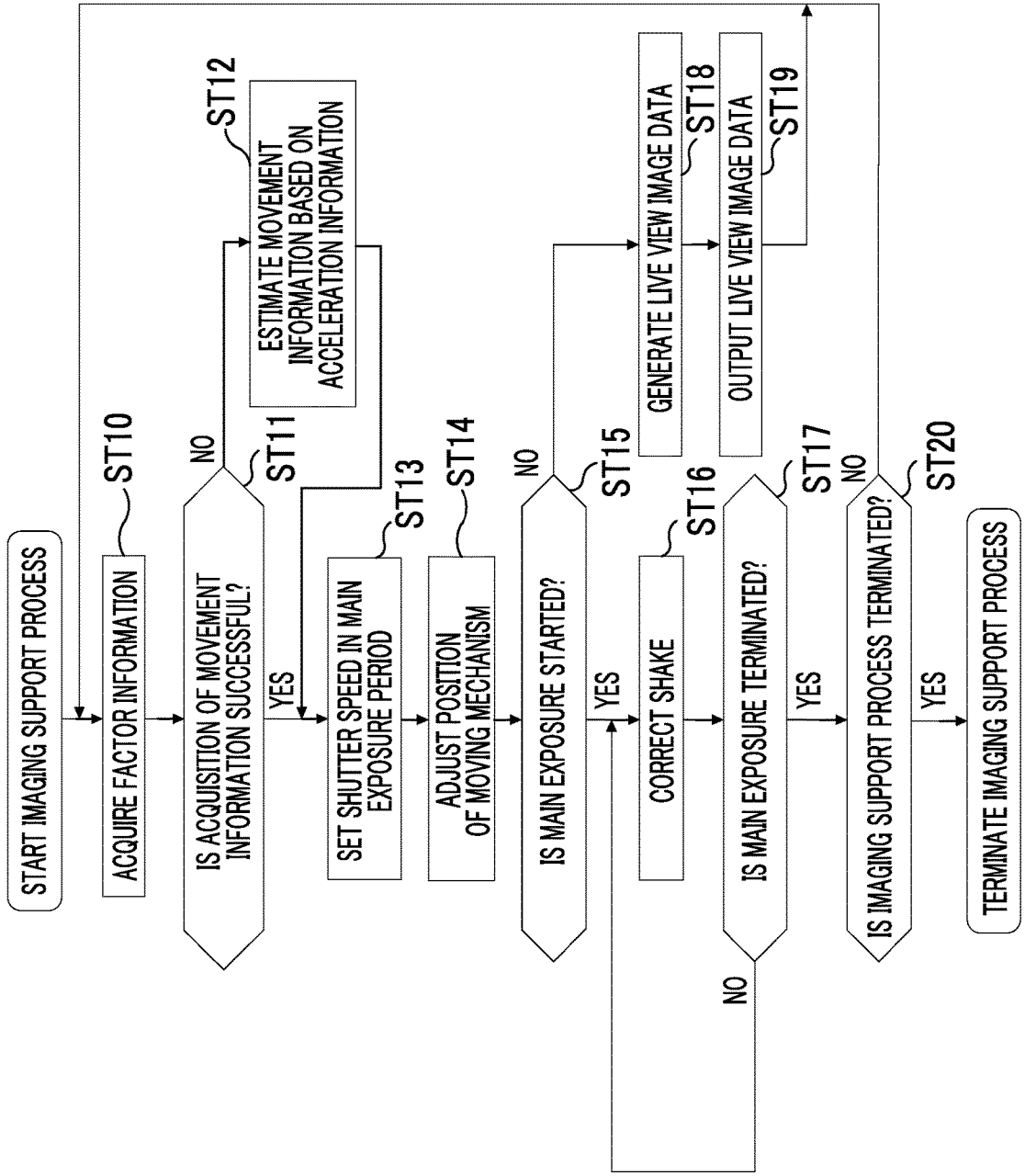
FIG. 16 is a flowchart showing an example of a flow of an imaging support process.

Next, an action of the imaging apparatus 50 according to the present embodiment will be described with reference to FIG. 16. FIG. 16 shows an example of a flow of the imaging support process according to the present embodiment.

In the imaging support process shown in FIG. 16, first, in step ST10, the acquisition unit 122 acquires the factor information 204A including the movement information 206, the wind information 208, the distance information 210, and the gimbal information 212. After the process of step ST10 is executed, the imaging support process proceeds to step ST11. Step ST10 is an example of an "acquisition step" according to the technology of the present disclosure. The process executed by the acquisition unit 122 is an example of an "acquisition process" according to the technology of the present disclosure.

In step ST11, the acquisition determination unit 124 determines whether or not the acquisition of the movement information 206 by the acquisition unit 122 is successful. In a case in which the acquisition of the movement information 206 by the acquisition unit 122 fails in step ST11, a negative determination is made, and the imaging support process proceeds to step ST12. In a case in which the acquisition of the movement information 206 by the acquisition unit 122 is successful in step ST11, a positive determination is made, and the imaging support process proceeds to step ST13.

In step ST12, the estimation unit 126 estimates the movement information 236 related to the speed and the direction of the flying object 10 based on the acceleration information 230 from the acceleration sensor 72 provided in the imaging apparatus 50, for example. As a result, the factor information 204B in which the movement information 236 estimated by the estimation unit 126 is added to the distance information 210, the wind information 208, and the gimbal information 212 acquired by the acquisition unit 122 is obtained. After the process of step ST12 is executed, the imaging support process proceeds to step ST13. Step ST12 is an example of a "second estimation step" according to the technology of the present disclosure.

In step ST13, the setting unit 128 sets the shutter speed in the main exposure period based on the factor information 204A acquired in step ST10 or the factor information 204B obtained in step ST12. After the process of step ST13 is executed, the imaging support process proceeds to step ST14. Step ST13 is an example of a "setting step" according to the technology of the present disclosure. The process executed by the setting unit 128 is an example of a "setting process".

In step ST14, the adjustment processing unit 130 adjusts the position of the moving mechanism 90 that moves the image sensor 62 based on the factor information 204A acquired in step ST10 or the factor information 204B obtained in step ST12. After the process of step ST14 is executed, the imaging support process proceeds to step ST15. Step ST14 is an example of an "adjustment step" according to the technology of the present disclosure. The process executed by the adjustment processing unit 130 is an example of an "adjustment process".

In step ST15, the imaging processing unit 132 determines whether or not the main exposure is started. In a case in which the main exposure is started in step ST15, a positive determination is made, and the imaging support process proceeds to step ST16. In a case in which the main exposure is not started in step ST15, a negative determination is made, and the imaging support process proceeds to step ST18. Step ST15 and step ST17, which will be described below, are examples of an "imaging step" according to the technology of the present disclosure. The process executed by the imaging processing unit 132 is an example of the "imaging process".

In step ST16, the correction processing unit 134 corrects the shake applied to the image sensor 62 by using the moving mechanism 90 based on the factor information 204A acquired in step ST10 or the factor information 204B obtained in step ST12. After the process of step ST16 is executed, the imaging support process proceeds to step ST17. Step ST16 is an example of a "correction step" according to the technology of the present disclosure. The process executed by the correction processing unit 134 is an example of a "correction process".

In step ST17, the imaging processing unit 132 determines whether or not the main exposure is terminated. In a case in which the main exposure is not terminated in step ST17, a negative determination is made, and the imaging support process proceeds to step ST16. In a case in which the main exposure is terminated in step ST17, a positive determination is made, and the imaging support process proceeds to step ST20.

In step ST18, the data output unit 136 generates the live view image data 250 based on the image data 232 stored in the image memory 76. After the process of step ST18 is executed, the imaging support process proceeds to step ST19.

In step ST19, the data output unit 136 outputs the live view image data 250 generated in step ST18 to the display 152. In a case in which the data output unit 136 executes the generation process and the output process of the live view image data 250, the position of the moving mechanism 90 is maintained by the control by the driver for shake correction 68. After the process of step ST19 is executed, the imaging support process proceeds to step ST10. Step ST18 and step ST19 are examples of an "output step" according to the technology of the present disclosure.

In step ST20, the CPU 82 determines whether or not a condition for terminating the imaging support process is satisfied. Examples of the condition for terminating the imaging support process include a condition that the imaging apparatus 50 receives a termination instruction (for example, an instruction to switch the imaging apparatus 50 to a mode other than the imaging mode) which is an instruction to terminate the imaging mode of the imaging apparatus 50. In a case in which the condition for terminating the imaging support process is not satisfied in step ST20, a negative determination is made, and the imaging support process proceeds to step ST10. In a case in which the condition for terminating the imaging support process is satisfied in step ST20, a positive determination is made, and the imaging support process is terminated. The control method described as the action of the imaging apparatus 50 described above is an example of a "control method" according to the technology of the present disclosure.

As described above, in the imaging apparatus 50 according to the present embodiment, the factor information 204A including the movement information 206 of the flying object 10 is acquired by the acquisition unit 122. In addition, based on the factor information 204A, the position of the moving mechanism 90 that moves the image sensor 62 provided in the imaging apparatus 50 is adjusted by the adjustment processing unit 130. Moreover, after the position of the moving mechanism 90 is adjusted, in a case in which the imaging process of imaging the subject by using the image sensor 62 is executed by the imaging processing unit 132, the shake applied to the image sensor 62 is corrected by using the moving mechanism 90 by the correction processing unit 134. Therefore, by adjusting the position of the moving mechanism 90 based on the factor information 204A, it is possible to secure a movable distance (that is, shake correction distance) of the image sensor 62 in a case in which the imaging process is executed. As a result, for example, the shake of the image can be suppressed in accordance with the factor information 204 as compared with a case in which the position of the moving mechanism 90 is not adjusted based on the factor information 204A.

In addition, the movement information 206 included in the factor information 204A acquired by the acquisition unit 122 is information based on the flight instruction information 200 related to the speed and the direction input to the flying object 10. Therefore, for example, based on the acceleration information 220 from the acceleration sensor 24 provided in the flying object 10 or the acceleration information 230 from the acceleration sensor 72 provided in the imaging apparatus 50, the calculation processing amount of the acquisition unit 122 can be reduced as compared with a case in which the acquisition unit 122 generates the movement information 206 related to the speed and the direction of the flying object 10, so that the responsiveness of the imaging apparatus 50 can be improved.

In addition, in a case in which the acquisition of the movement information 206 by the acquisition unit 122 fails, the estimation unit 126 estimates the movement information 206 based on, for example, the acceleration information 230 from the acceleration sensor 72 provided in the imaging apparatus 50, or the first image data 232A and the second image data 232B obtained by being captured by using the image sensor 62. Therefore, even in a case in which the acquisition of the movement information 206 by the acquisition unit 122 fails, it is possible to obtain the factor information 204B in which the movement information 236 estimated by the estimation unit 126 is added to the distance information 210, the wind information 208, and the gimbal information 212 acquired by the acquisition unit 122. As a result, based on the factor information 204B, the setting process by the setting unit 128, the adjustment process by the adjustment processing unit 130, and the correction process by the correction processing unit 134 can be executed.

In addition, the setting unit 128 sets the shutter speed as an example of the imaging condition of the imaging apparatus 50 based on the factor information 204 (that is, the factor information 204A or the factor information 204B). Therefore, the shutter speed can be set to a value in accordance with the factor information 204. As a result, for example, the imaging process can be executed at the shutter speed in accordance with the factor information 204, as compared with a case in which the shutter speed is set without being based on the factor information 204.

In addition, the adjustment process executed by the adjustment processing unit 130 (that is, the process of adjusting the position of the moving mechanism 90 that moves the image sensor 62) is executed based on the factor information 204. Therefore, in the adjustment process, the position of the moving mechanism 90 can be adjusted in accordance with the factor information 204. As a result, for example, the shake correction distance can be secured in accordance with the factor information 204 as compared with a case in which the adjustment process is executed without being based on the factor information 204.

In addition, the correction process by the correction processing unit 134 (that is, the process of correcting the shake applied to the image sensor 62 by using the moving mechanism 90) is executed based on the factor information 204. Therefore, it is possible to correct the shake applied to the image sensor 62 in accordance with the factor information 204. As a result, for example, it is possible to suppress the shake of the image in accordance with the factor information 204, as compared with a case in which the correction process is executed without being based on the factor information 204.

In addition, the factor information 204 includes the wind information 208 related to the wind generated in the environment in which the moving body flies. Therefore, in the setting process executed by the setting unit 128 (that is, the process of setting the shutter speed), the shutter speed can be set in accordance with the wind information 208. As a result, for example, the imaging process can be executed at the shutter speed in accordance with the wind information 208 as compared with a case in which the setting process is executed without being based on the wind information 208.

In addition, since the factor information 204 includes the wind information 208, the position of the moving mechanism 90 can be adjusted in accordance with the wind information 208 in the adjustment process executed by the adjustment processing unit 130. As a result, for example, the shake correction distance can be secured in accordance with the wind information 208 as compared with a case in which the adjustment process is executed without being based on the wind information 208.

In addition, since the factor information 204 includes the wind information 208, the shake applied to the image sensor 62 can be corrected in accordance with the wind information 208 in the correction process executed by the correction processing unit 134. As a result, for example, the shake of the image can be suppressed in accordance with the wind information 208 as compared with a case in which the correction process is executed without being based on the wind information 208.

In addition, the factor information 204 includes the distance information 210 related to the distance between the imaging apparatus 50 and the subject. Therefore, in the setting process executed by the setting unit 128, the shutter speed can be set in accordance with the distance information 210. As a result, for example, the imaging process can be executed at the shutter speed in accordance with the distance information 210 as compared with a case in which the setting process is executed without being based on the distance information 210.

In addition, since the factor information 204 includes the distance information 210, the position of the moving mechanism 90 can be adjusted in accordance with the distance information 210 in the adjustment process executed by the adjustment processing unit 130. As a result, for example, the shake correction distance can be secured in accordance with the distance information 210 as compared with a case in which the adjustment process is executed without being based on the distance information 210.

In addition, since the factor information 204 includes the distance information 210, the shake applied to the image sensor 62 can be corrected in accordance with the distance information 210 in the correction process executed by the correction processing unit 134. As a result, for example, the shake of the image can be suppressed in accordance with the distance information 210 as compared with a case in which the correction process is executed without being based on the distance information 210.

In addition, the factor information 204 includes the gimbal information 212 related to the gimbal mechanism 14 that supports the imaging apparatus 50 with respect to the flying object 10. Therefore, in the setting process executed by the setting unit 128, the shutter speed can be set in accordance with the gimbal information 212. As a result, for example, the imaging process can be executed at the shutter speed in accordance with the gimbal information 212 as compared with a case in which the setting process is executed without being based on the gimbal information 212.

In addition, since the factor information 204 includes the gimbal information 212, the position of the moving mechanism 90 can be adjusted in accordance with the gimbal information 212 in the adjustment process executed by the adjustment processing unit 130. As a result, for example, the shake correction distance can be secured in accordance with the gimbal information 212 as compared with a case in which the adjustment process is executed without being based on the gimbal information 212.

In addition, since the factor information 204 includes the gimbal information 212, the shake applied to the image sensor 62 can be corrected in accordance with the gimbal information 212 in the correction process executed by the correction processing unit 134. As a result, for example, the shake of the image can be suppressed in accordance with the gimbal information 212 as compared with a case in which the correction process is executed without being based on the gimbal information 212.

In addition, the gimbal information 212 includes the axis information 212A which is information related to the axis of the gimbal mechanism 14. Therefore, it is possible to execute the setting process by the setting unit 128 based on the axis information 212A. As a result, for example, the imaging process can be executed at the shutter speed in accordance with the axis information 212A as compared with a case in which the setting process is executed without being based on the axis information 212A.

In addition, since the gimbal information 212 includes the axis information 212A, the position of the moving mechanism 90 can be adjusted in accordance with the axis information 212A in the adjustment process executed by the adjustment processing unit 130. As a result, for example, the shake correction distance can be secured in accordance with the axis information 212A as compared with a case in which the adjustment process is executed without being based on the axis information 212A.

In addition, since the gimbal information 212 includes the axis information 212A, the shake applied to the image sensor 62 can be corrected in accordance with the axis information 212A in the correction process executed by the correction processing unit 134. As a result, for example, the shake of the image can be suppressed in accordance with the axis information 212A as compared with a case in which the correction process is executed without being based on the axis information 212A.

In addition, the gimbal information 212 includes the frequency band information 212B which is information related to the frequency band that can be corrected by using the gimbal mechanism 14. Therefore, it is possible to execute the setting process by the setting unit 128 based on the frequency band information 212B. As a result, for example, the imaging process can be executed at the shutter speed in accordance with the frequency band information 212B as compared with a case in which the setting process is executed without being based on the frequency band information 212B.

In addition, since the gimbal information 212 includes the frequency band information 212B, the position of the moving mechanism 90 can be adjusted in accordance with the frequency band information 212B in the adjustment process executed by the adjustment processing unit 130. As a result, for example, the shake correction distance can be secured in accordance with the frequency band information 212B as compared with a case in which the adjustment process is executed without being based on the frequency band information 212B.

In addition, since the gimbal information 212 includes the frequency band information 212B, the shake applied to the image sensor 62 can be corrected in accordance with the frequency band information 212B in the correction process executed by the correction processing unit 134. As a result, for example, the shake of the image can be suppressed in accordance with the frequency band information 212B as compared with a case in which the correction process is executed without being based on the frequency band information 212B.

In addition, in the output process executed by the data output unit 136 after the adjustment process executed by the adjustment processing unit 130 (that is, the process of outputting the live view image data 250 obtained by imaging the subject using the image sensor 62 to the display 152), the position of the moving mechanism 90 is maintained. Therefore, in a case in which the main exposure is started, the image sensor 62 can be moved by the correction processing unit 134 from the position adjusted by the adjustment processing unit 130. As a result, for example, the shake correction distance can be secured as compared with a case in which the position of the image sensor 62 is not adjusted by the adjustment processing unit 130.

In addition, in the output process executed by the data output unit 136, the shake applied to the imaging apparatus 50 is corrected by using the gimbal mechanism 14 that supports the imaging apparatus 50 with respect to the flying object 10. Therefore, it is possible to suppress the shake of the image in the output process. As a result, for example, the live view image with good image quality can be obtained as compared with a case in which the output process is executed without correcting the shake applied to the imaging apparatus 50 by using the gimbal mechanism 14.

In addition, the imaging apparatus 50 is mounted on the flying object 10. Therefore, for example, a degree of freedom of the target object 2 that can be imaged by using the imaging apparatus 50 can be improved as compared with a case in which a person carries the imaging apparatus 50 or the imaging apparatus 50 is mounted on a vehicle or the like.

Figure 17:
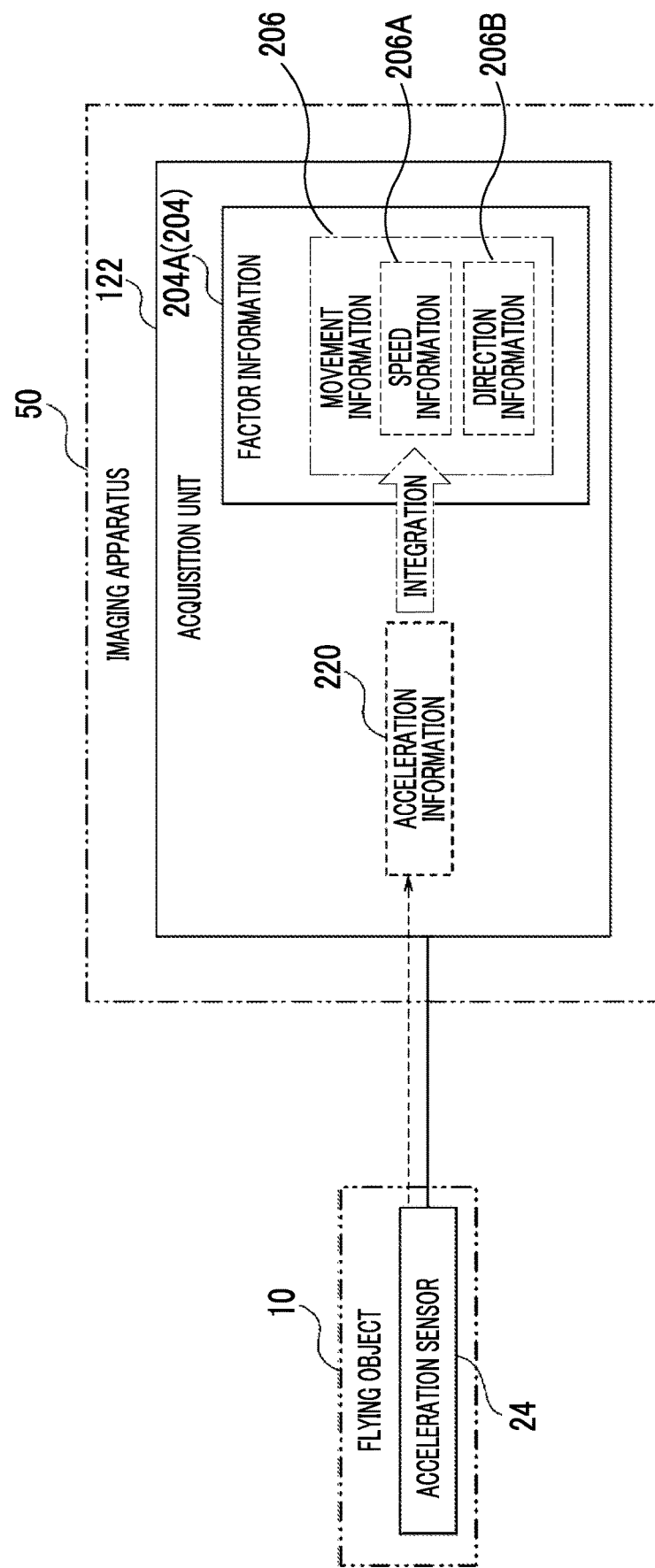
FIG. 17 is a block diagram showing a first modification example of the acquisition unit.

It should be noted that, as an example, as shown in FIG. 17, the acquisition unit 122 may acquire the acceleration information 220 from the acceleration sensor 24 of the flying object 10. Moreover, the acquisition unit 122 may acquire the speed information 206A related to the speed of the flying object 10 by integrating the acceleration indicated by the acceleration information 220. In addition, the acquisition unit 122 may acquire the direction information 206B related to the direction in which the flying object 10 moves based on the direction of the acceleration indicated by the acceleration information 220. In addition, for example, in a case in which the speed information 206A and the direction information 206B are generated from the acceleration information 220 in the flying object 10, the acquisition unit 122 may acquire the speed information 206A and the direction information 206B from the flying object 10.

In addition, a gyro sensor may be used instead of the acceleration sensor 24. The gyro sensor detects a rotation shake amount around each axis of the pitch axis, the yaw axis, and the roll axis of the flying object 10. The rotation shake amount around the pitch axis and the rotation shake amount around the yaw axis detected by the gyro sensor are converted into the shake amount in a two-dimensional plane parallel to the pitch axis and the yaw axis in the pitch axis direction, so that the shake amounts of the flying object 10 in the pitch axis direction and the yaw axis direction are detected.

Figure 18:
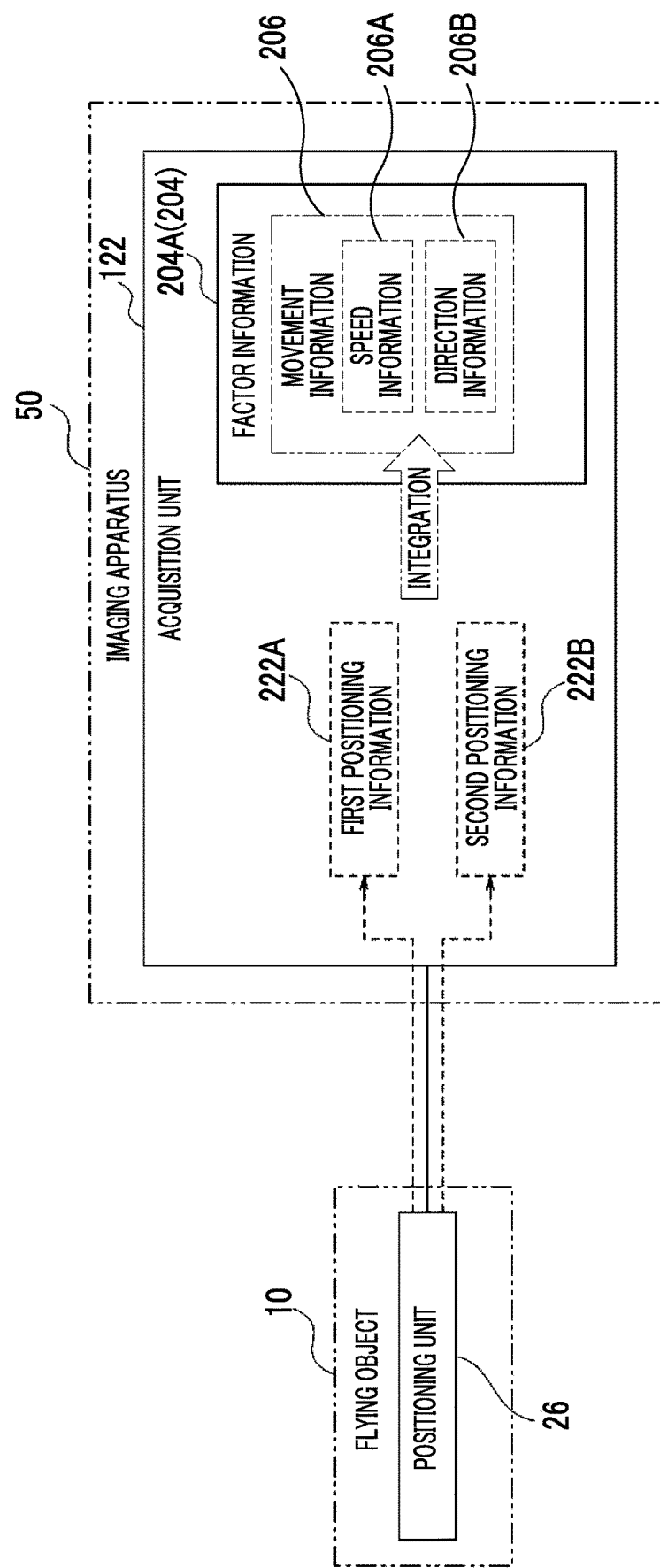
FIG. 18 is a block diagram showing a second modification example of the acquisition unit.

In addition, as shown in FIG. 18, as an example, the acquisition unit 122 may sequentially acquire first positioning information 222A and second positioning information 222B from the positioning unit 26 of the flying object 10. The second positioning information 222B is information obtained after the first positioning information 222A. Moreover, the acquisition unit 122 may acquire the speed information 206A related to the speed of the flying object 10 based on a time interval between the first positioning information 222A and the second positioning information 222B, and the moving distance of the flying object 10 indicated by the first positioning information 222A and the second positioning information 222B. In addition, the direction information 206B related to the direction in which the flying object 10 moves may be acquired based on the change in the position of the flying object 10 indicated by the first positioning information 222A and the second positioning information 222B.

Figure 19:
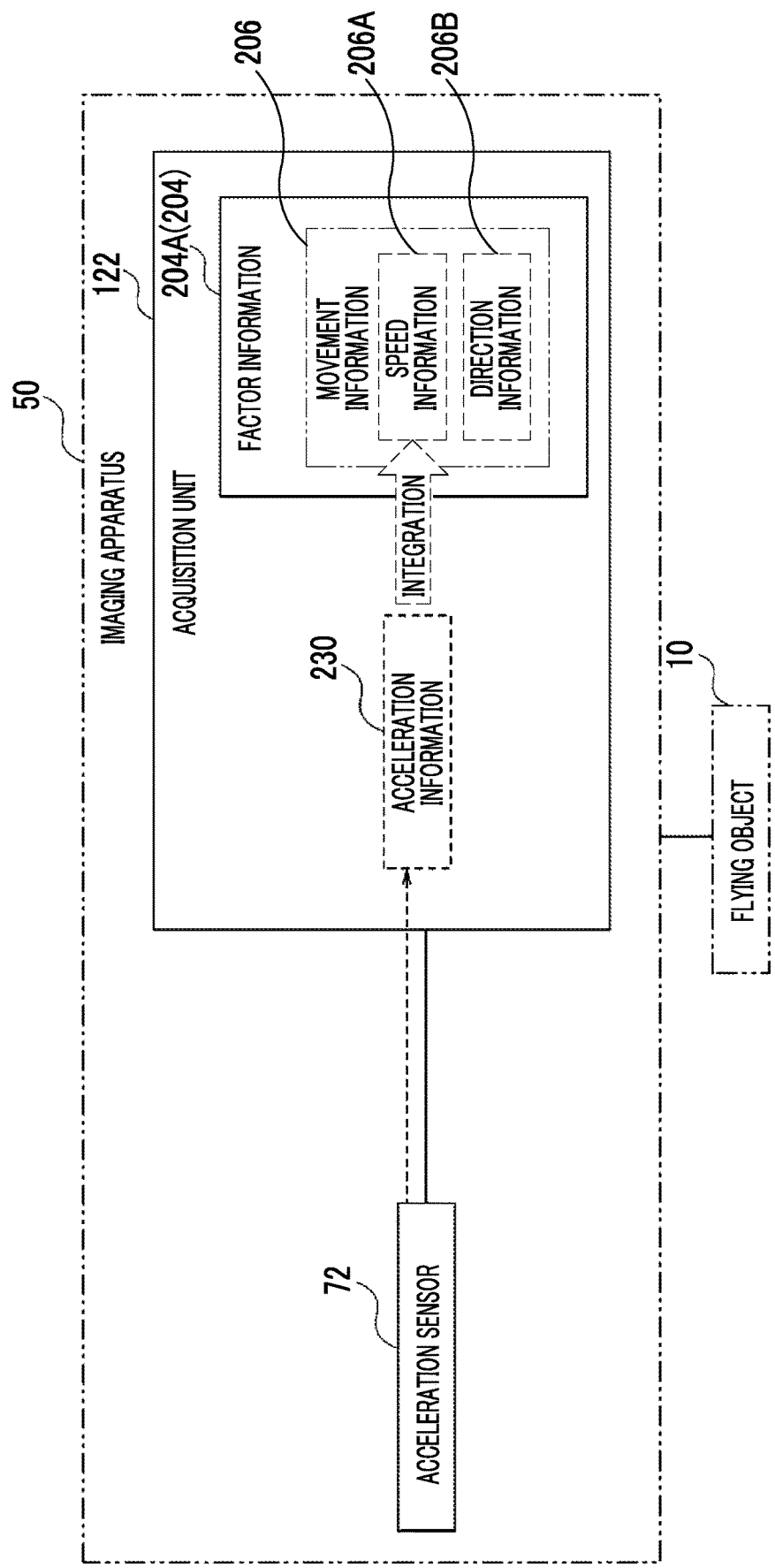
FIG. 19 is a block diagram showing a third modification example of the acquisition unit.

In addition, as shown in FIG. 19, as an example, the acquisition unit 122 may acquire the acceleration information 230 from the acceleration sensor 72 provided in the imaging apparatus 50. Moreover, the acquisition unit 122 may acquire the speed information 206A related to the speed of the flying object 10 moving integrally with the imaging apparatus 50 by integrating the acceleration indicated by the acceleration information 230 from the acceleration sensor 72. In addition, the acquisition unit 122 may acquire the direction information 206B related to the direction in which the flying object 10 moves based on the direction of the acceleration indicated by the acceleration information 230. In addition, a gyro sensor may be used instead of the acceleration sensor 72.

Figure 20:
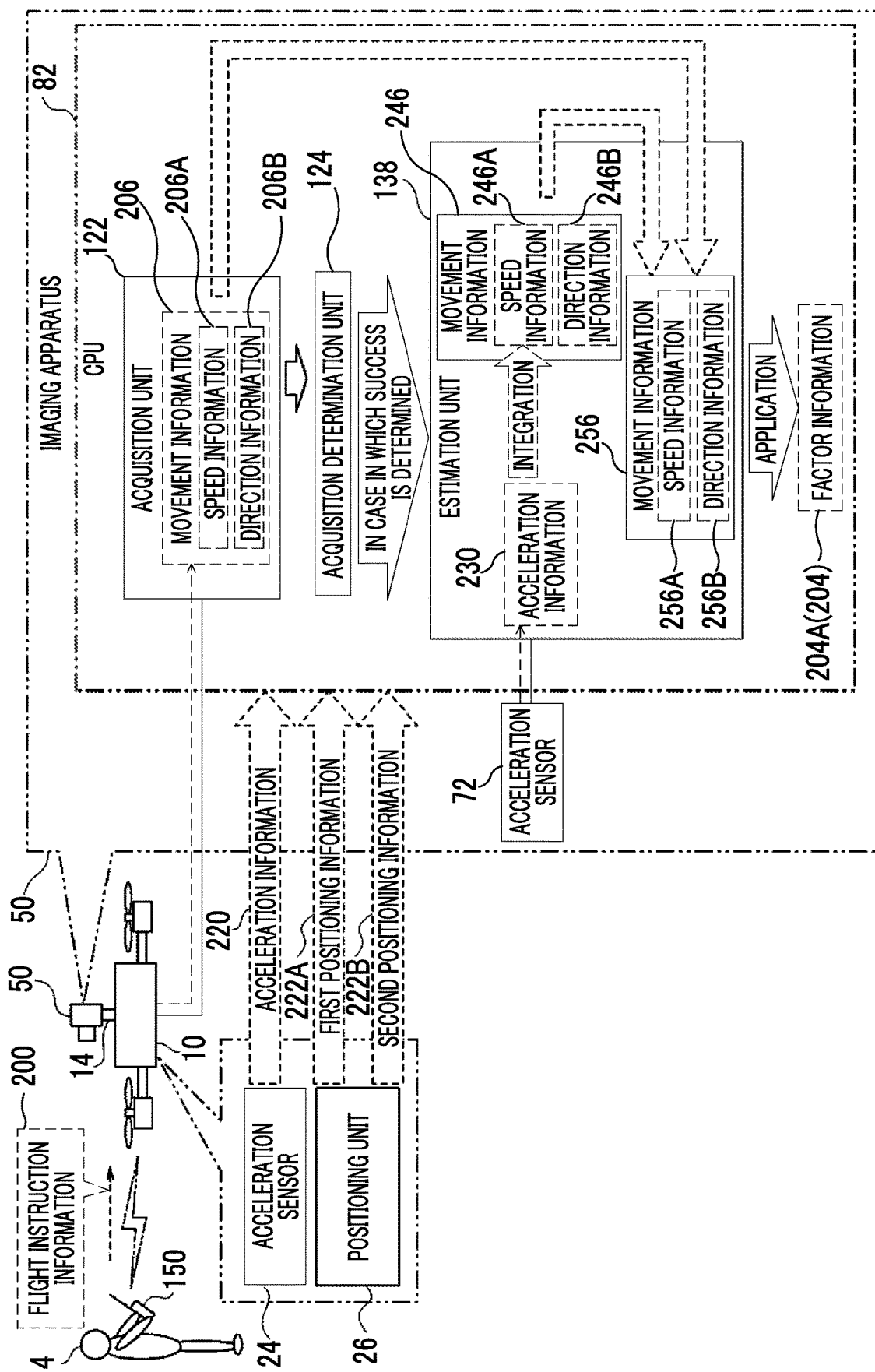
FIG. 20 is a block diagram showing a modification example in which an estimation unit different from the estimation unit is added.

In addition, as shown in FIG. 20 as an example, the CPU 82 may operate as an estimation unit 138 in a case in which the acquisition determination unit 124 determines that the acquisition of the movement information 206 by the acquisition unit 122 is successful. The estimation unit 138 estimates movement information 256, which is estimation information, based on the movement information 206 acquired by the acquisition unit 122 and the acceleration information 230 from the acceleration sensor 72 provided in the imaging apparatus 50 as an example.

That is, the estimation unit 138 acquires speed information 246A related to the speed of the flying object 10 by integrating the acceleration indicated by the acceleration information 230. In addition, the estimation unit 138 acquires direction information 246B related to the direction of the flying object 10 based on the direction of the acceleration indicated by the acceleration information 230. As a result, movement information 246 including the speed information 246A and the direction information 246B is obtained.

In addition, for example, the estimation unit 138 estimates the speed of the flying object 10 by calculating the average value of the first speed indicated by the speed information 206A and the second speed indicated by the speed information 246A, and acquires speed information 256A which is estimation information related to the estimated speed. In addition, for example, the estimation unit 138 estimates the direction of the flying object 10 by calculating the average value of the azimuthal angle in the first direction indicated by the direction information 206B and the azimuthal angle in the second direction indicated by the direction information 246B, and acquires direction information 256B, which is estimation information related to the estimated direction. As a result, the movement information 256 including the speed information 256A and the direction information 256B is obtained. Moreover, the movement information 256 estimated by the estimation unit 138 may be applied to the factor information 204A. The acceleration information 230 is an example of "first acceleration sensor information" according to the technology of the present disclosure. The movement information 256 estimated by the estimation unit 138 is an example of "first movement information" according to the technology of the present disclosure.

Figure 21:
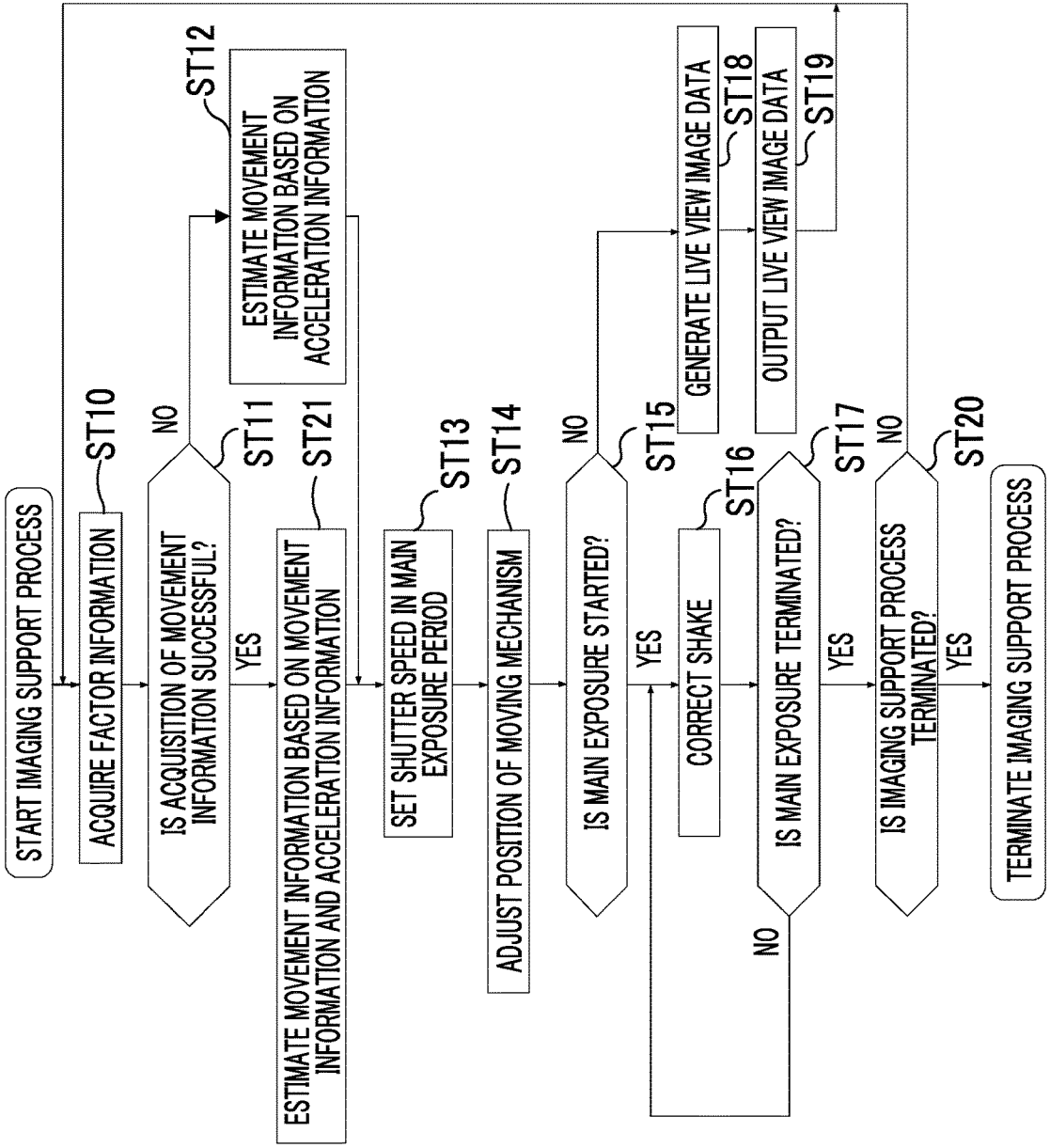
FIG. 21 is a flowchart showing a modification example of the flow of the imaging support process.

FIG. 21 shows an example of a flowchart of the imaging support process according to a modification example shown in FIG. 20. In the imaging support process shown in FIG. 21, step ST21 executed by the estimation unit 138 is added. Step ST21 is executed in a case in which it is determined in step ST11 that the acquisition of the movement information 206 by the acquisition unit 122 is successful. In step ST21, the estimation unit 138 estimates the movement information 256 based on the movement information 206 acquired by the acquisition unit 122 and the acceleration information 230 from the acceleration sensor 72 provided in the imaging apparatus 50. After the process of step ST21 is executed, the imaging support process proceeds to step ST13. Step ST21 is an example of a "first estimation step" according to the technology of the present disclosure.

In the example shown in FIGS. 20 and 21, the estimation unit 138 estimates the movement information 256 based on the movement information 206 acquired by the acquisition unit 122 and the acceleration information 230 from the acceleration sensor 72 provided in the imaging apparatus 50. Therefore, the speed and the direction of the flying object 10 are obtained based on the movement information 206 acquired by the acquisition unit 122 and the acceleration information 230 from the acceleration sensor 72 provided in the imaging apparatus 50. As a result, for example, the accuracy of the speed and the direction of the flying object 10 can be improved as compared with a case in which the speed and the direction of the flying object 10 are obtained only from the movement information 206 acquired by the acquisition unit 122.

It should be noted that, in the examples shown in FIGS. 20 and 21, the movement information 206 obtained from the flying object 10 may be information based on the acceleration information 220 from the acceleration sensor 24, or may be information based on the first positioning information 222A and the second positioning information 222B from the positioning unit 26. In addition, the movement information 206 may be the movement information 206 based on the flight instruction information 200.

In addition, in the examples shown in FIGS. 20 and 21, the estimation unit 138 may estimate the movement information 256 based on the movement information 206 based on the flight instruction information 200, the acceleration information 220 from the acceleration sensor 24, the first positioning information 222A and the second positioning information 222B from the positioning unit 26, and the acceleration information 230 from the acceleration sensor 72.

Figure 22:
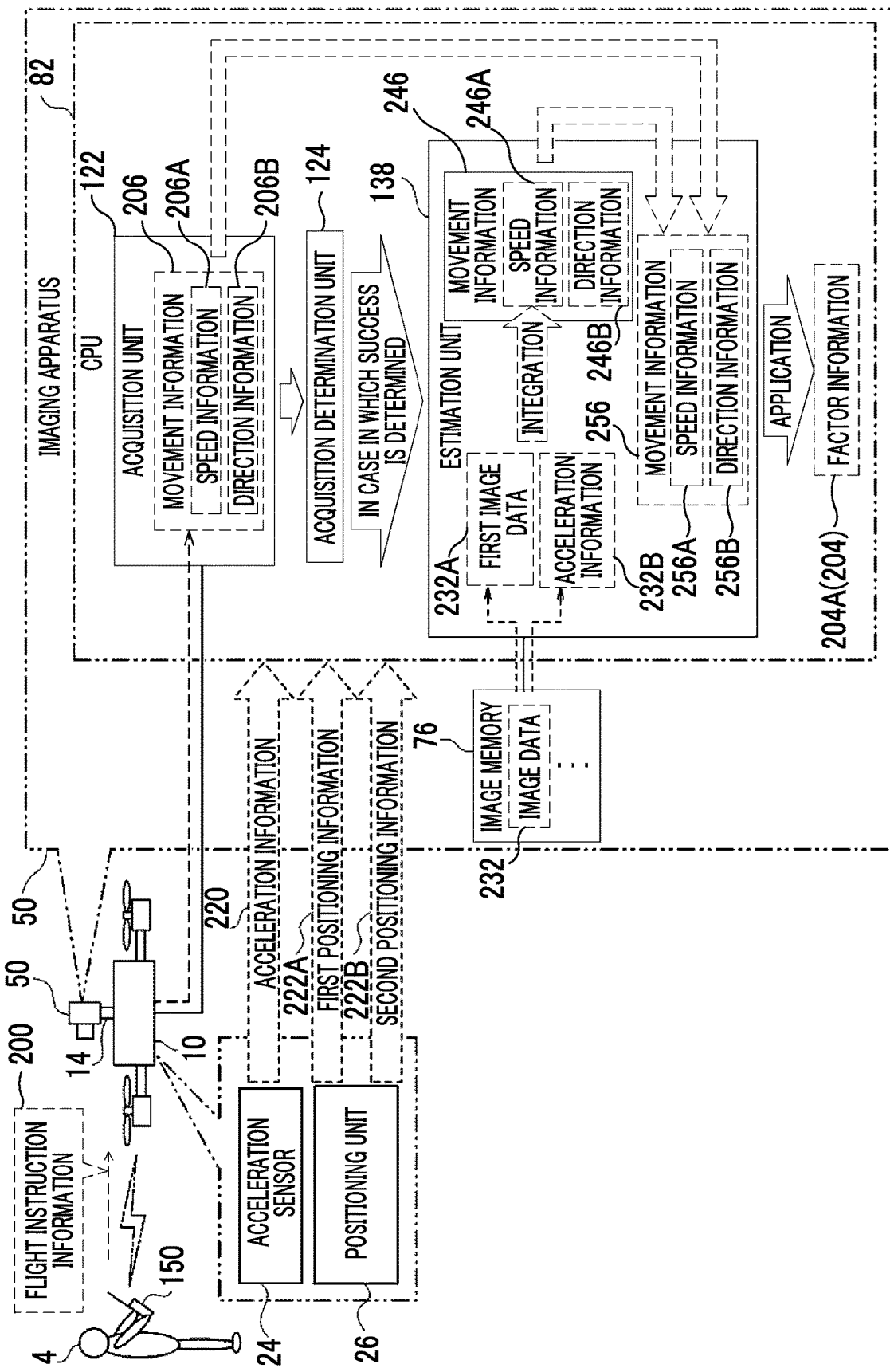
FIG. 22 is a block diagram showing a modification example of another estimation unit.

In addition, as shown in FIG. 22 as an example, the estimation unit 138 may acquire the movement information 246 in the following manner. In the example shown in FIG. 22, the estimation unit 138 sequentially acquires the first image data 232A and the second image data 232B from the image memory 76. The first image data 232A and the second image data 232B are first newest image data 232 and second newest image data 232 among the plurality of image data 232 recorded in the image memory 76. Moreover, the estimation unit 138 acquires the speed information 246A related to the speed of the flying object 10 based on a time interval in which the first image data 232A and the second image data 232B are recorded, and a moving distance of the flying object 10 derived based on the first image data 232A and the second image data 232B. In addition, the estimation unit 138 acquires the direction information 246B related to the direction in which the flying object 10 moves based on the change in the position of the flying object 10 indicated by the first image data 232A and the second image data 232B. As a result, the movement information 246 including the speed information 246A and the direction information 246B is obtained.

Moreover, the movement information 256 estimated based on the movement information 206 acquired by the acquisition unit 122 and the movement information 246 obtained by the estimation unit 138 may be applied to the factor information 204A. The first image data 232A and the second image data 232B are examples of "first image information" according to the technology of the present disclosure.

In the example shown in FIG. 22, the estimation unit 138 estimates the movement information 256 based on the movement information 206 acquired by the acquisition unit 122 and the first image data 232A and the second image data 232B stored in the image memory 76. Therefore, the speed and the direction of the flying object 10 are obtained based on the movement information 206 acquired by the acquisition unit 122, and the first image data 232A and the second image data 232B. As a result, for example, the accuracy of the speed and the direction of the flying object 10 can be improved as compared with a case in which the speed and the direction of the flying object 10 are obtained only from the movement information 206 acquired by the acquisition unit 122.

It should be noted that, in the examples shown in FIG. 22, the movement information 206 obtained from the flying object 10 may be information based on the acceleration information 220 from the acceleration sensor 24, or may be information based on the first positioning information 222A and the second positioning information 222B from the positioning unit 26. In addition, the movement information 206 may be information based on the flight instruction information 200.

In addition, in the example shown in FIG. 22, the estimation unit 138 may estimate the movement information 256 based on the movement information 206 based on the flight instruction information 200, the acceleration information 220 from the acceleration sensor 24, the first positioning information 222A and the second positioning information 222B from the positioning unit 26, and the first image data 232A and the second image data 232B.

Figure 23:
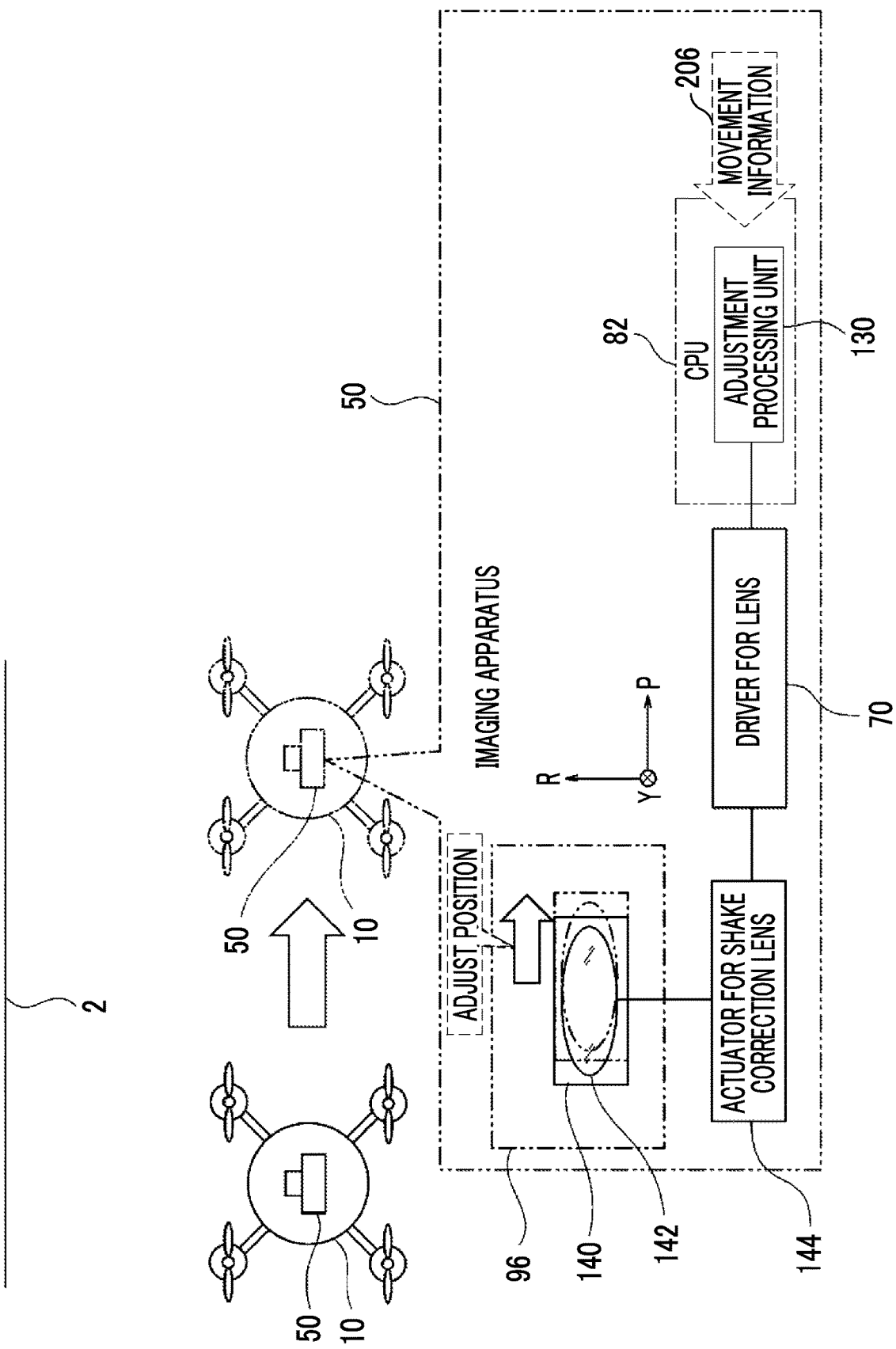
FIG. 23 is a block diagram showing an anti-vibration function of the imaging apparatus and a modification example of the adjustment processing unit.

In addition, in the embodiment described above, the imaging apparatus 50 has a body image stabilization (BIS) type shake correction function, but as shown in FIG. 23, the imaging apparatus 50 may have an optical image stabilization (OIS) type shake correction function. In the example shown in FIG. 23, the imaging apparatus 50 comprises a shake correction lens 142 constituting the imaging lens 96, and an actuator for shake correction lens 144. The actuator for shake correction lens 144 comprises, for example, a voice coil motor or a piezoelectric element. The shake correction lens 142 is fixed to a moving mechanism 140. The shake correction lens 142 is an example of a "part of an imaging lens" according to the technology of the present disclosure, and is, for example, the objective lens 98, the focus lens 100, or the zoom lens 102 in FIG. 4. The moving mechanism 140 moves the imaging lens 96 in accordance with the shake applied to the imaging lens 96. The target of the imaging lens 96 moved by the moving mechanism 140 may be the entire imaging lens or may be a part of a component group.

The adjustment processing unit 130 adjusts the position of the moving mechanism 140 that moves the shake correction lens 142 by controlling the actuator for shake correction lens 144 via the driver for lens 70. By adjusting the position of the moving mechanism 140, the position of the shake correction lens 142 is adjusted.

The adjustment processing unit 130 adjusts the position of the moving mechanism 140 based on the direction indicated by the movement information 206. In the example shown in FIG. 23, the position of the moving mechanism 140 is adjusted in the same direction as the direction in which the flying object 10 moves, but the direction in which the position of the moving mechanism 140 is adjusted is determined by whether the power of the imaging lens 96 including the shake correction lens 142 is positive or negative.

Figure 24:
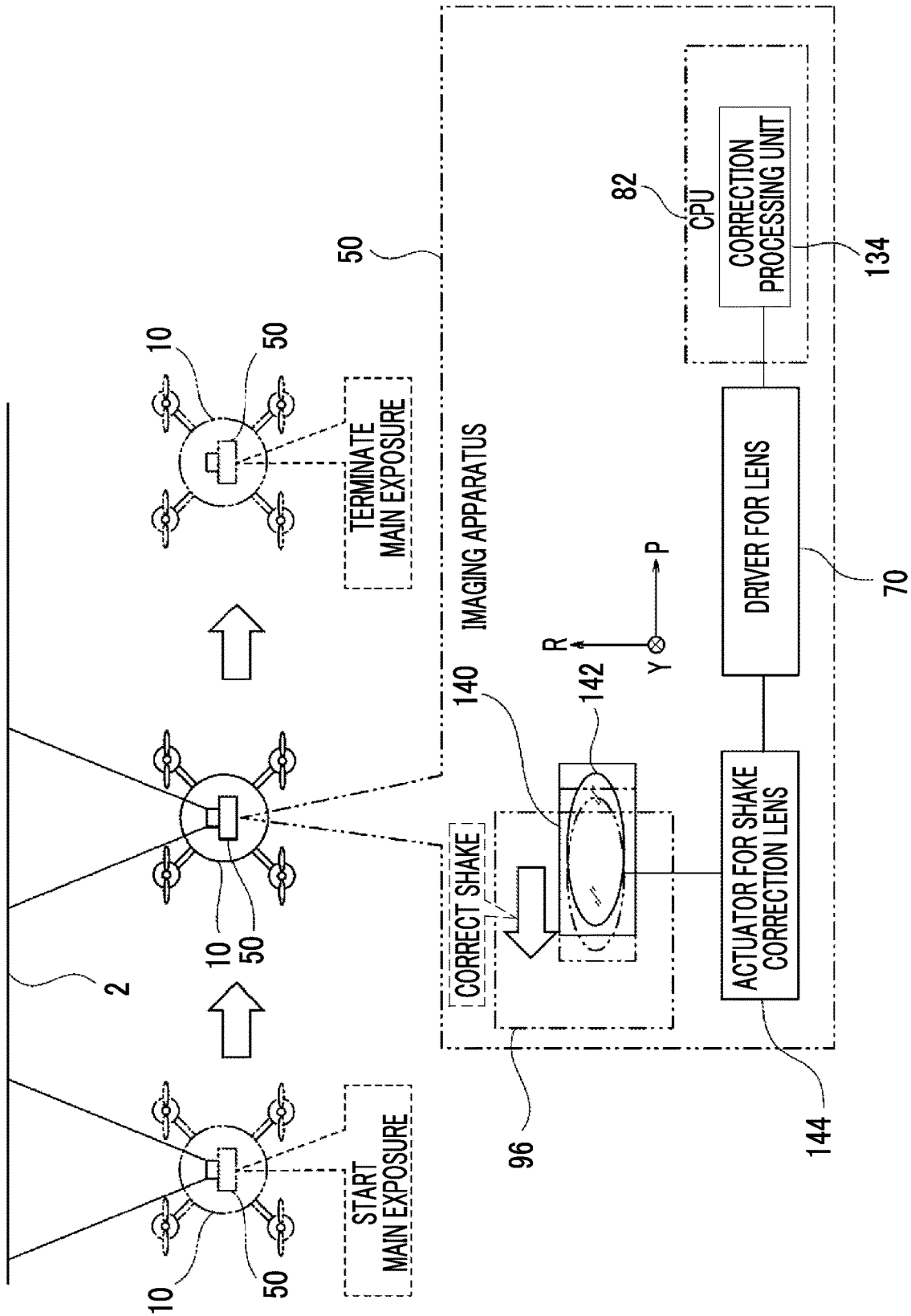
FIG. 24 is a block diagram showing an anti-vibration function of the imaging apparatus and a modification example of the correction processing unit.

In addition, as shown in FIG. 24, the correction processing unit 134 corrects the shake applied to the shake correction lens 142 by using the moving mechanism 140 as the correction process. That is, the correction processing unit 134 controls the actuator for shake correction lens 144 via the driver for lens 70 to move the shake correction lens 142 in the direction in which the shake of the image is corrected. It should be noted that the imaging apparatus 50 may have both the BIS type shake correction function and the OIS type shake correction function.

Figure 25:
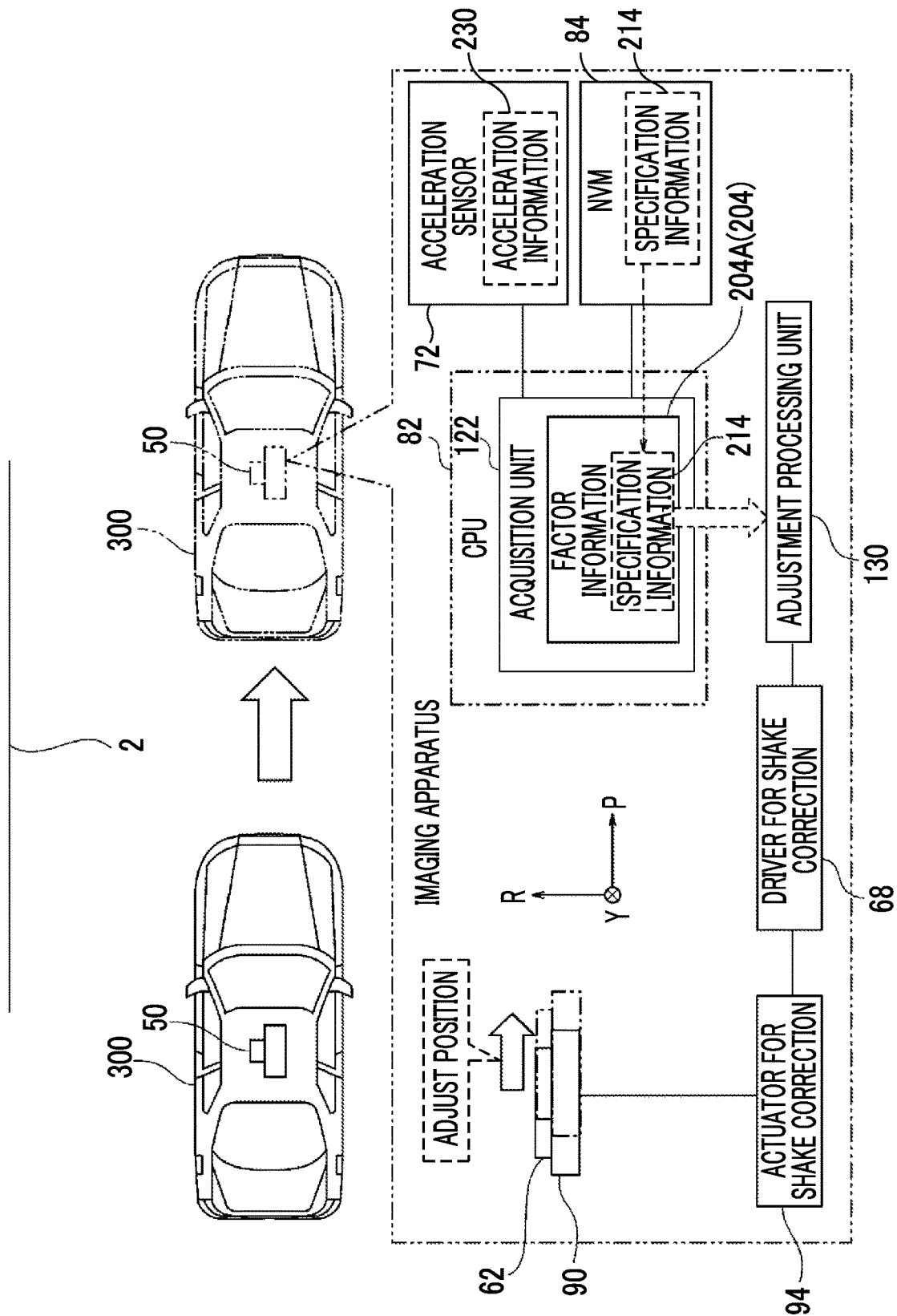
FIG. 25 is a block diagram showing a modification example of the imaging system, the acquisition unit, and the adjustment processing unit.

In addition, as shown in FIG. 25, the imaging apparatus 50 may be mounted on an automobile 300. The automobile 300 is an example of an "automobile" according to the technology of the present disclosure. In the example shown in FIG. 25, the automobile 300 is a passenger car, but may be an automobile other than the passenger car. For example, the NVM 84 stores specification information 214. The specification information 214 is information for specifying an imaging direction of the imaging apparatus 50.

In the example shown in FIG. 25, the imaging apparatus 50 is disposed in an orientation of imaging the left side of the automobile 300, but the imaging apparatus 50 may be disposed in a direction of imaging the right side, front, rear, upper side, lower side, or the like of the automobile 300. In addition, in the example shown in FIG. 25, the imaging apparatus 50 is installed on the roof of the automobile 300, but may be installed on the windshield, side mirror, trunk lid, or the like of the automobile 300.

The acquisition unit 122 acquires the factor information 204A including the specification information 214. It should be noted that, in a case in which moving direction information (not shown) indicating a moving direction of the automobile 300 is obtained from the automobile 300, the acquisition unit 122 may acquire the specification information 214 by specifying the imaging direction of the imaging apparatus 50 based on the moving direction information, and the acceleration information 230 obtained from the acceleration sensor 72 of the imaging apparatus 50.

In addition, in a case in which the imaging apparatus 50 imaging direction information (not shown) indicating the imaging direction of the imaging apparatus 50 is applied to the imaging apparatus 50 by the user 4, the acquisition unit 122 may acquire the specification information 214 based on the imaging direction information received by the imaging apparatus 50. In addition, the imaging apparatus 50 may be rotatably supported around the yaw axis with respect to the automobile 300. In this case, the specification information 214 for specifying the imaging direction may be acquired in accordance with the imaging direction of the imaging apparatus 50.

The adjustment processing unit 130 adjusts the position of the moving mechanism 90 that moves the image sensor 62 by controlling the actuator for shake correction 94 via the driver for shake correction 68 based on the factor information 204A. In addition, as shown in FIG. 26, the correction processing unit 134 adjusts the position of the moving mechanism 90 by controlling the actuator for shake correction 94 via the driver for shake correction 68 based on the factor information 204A.

Figure 26:
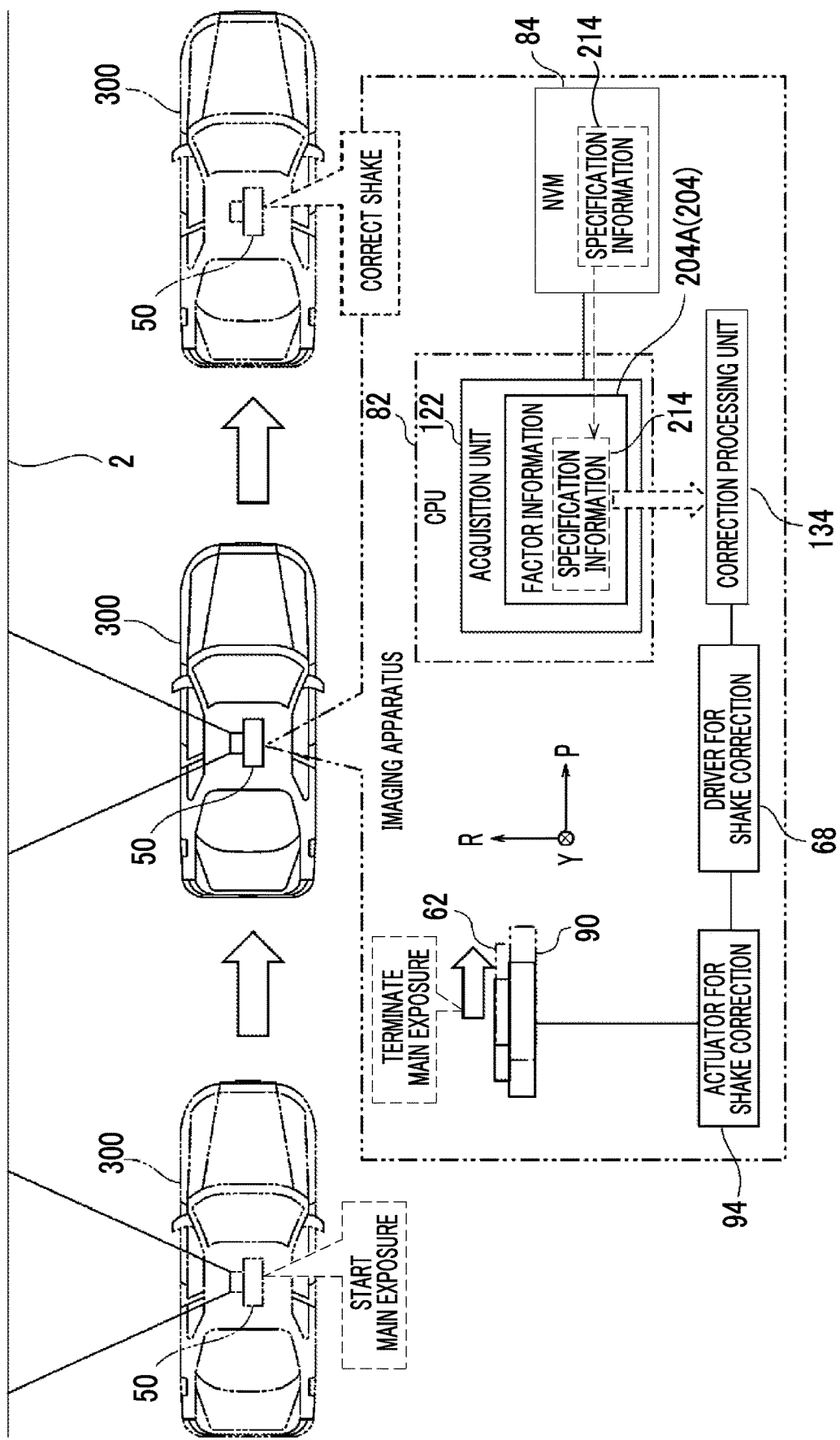
FIG. 26 is a block diagram showing a modification example of the imaging system, the acquisition unit, and the correction processing unit.

In the example shown in FIGS. 25 and 26, the imaging apparatus 50 is mounted on the automobile 300. Therefore, the target object 2 can be imaged by using the imaging apparatus 50 while the automobile 300 travels.

In addition, the factor information 204A includes the specification information 214 for specifying the imaging direction of the imaging apparatus 50. Therefore, the imaging direction of the imaging apparatus 50 can be specified based on the specification information 214. As a result, in the adjustment process executed by the adjustment processing unit 130, the position of the moving mechanism 90 can be adjusted in accordance with the imaging direction of the imaging apparatus 50.

In addition, since the factor information 204A includes the specification information 214, in the correction process executed by the correction processing unit 134, the shake applied to the image sensor 62 can be corrected in accordance with the imaging direction of the imaging apparatus 50.

It should be noted that the specification information 214 may be information for specifying an attachment position of the imaging apparatus 50 with respect to the automobile 300.

In addition, the target object to be moved by the adjustment processing unit 130 and the correction processing unit 134 may be an object, a structure, a mechanism, a device, or the like other than the image sensor 62 or the shake correction lens 142.

In addition, the imaging system S may be applied to a moving body (for example, a ship or an aerial vehicle) other than the flying object 10 or the automobile 300. In addition, the imaging system S may be applied to a vehicle (motorcycle, bicycle, or the like) other than the automobile 300.

Figure 27:
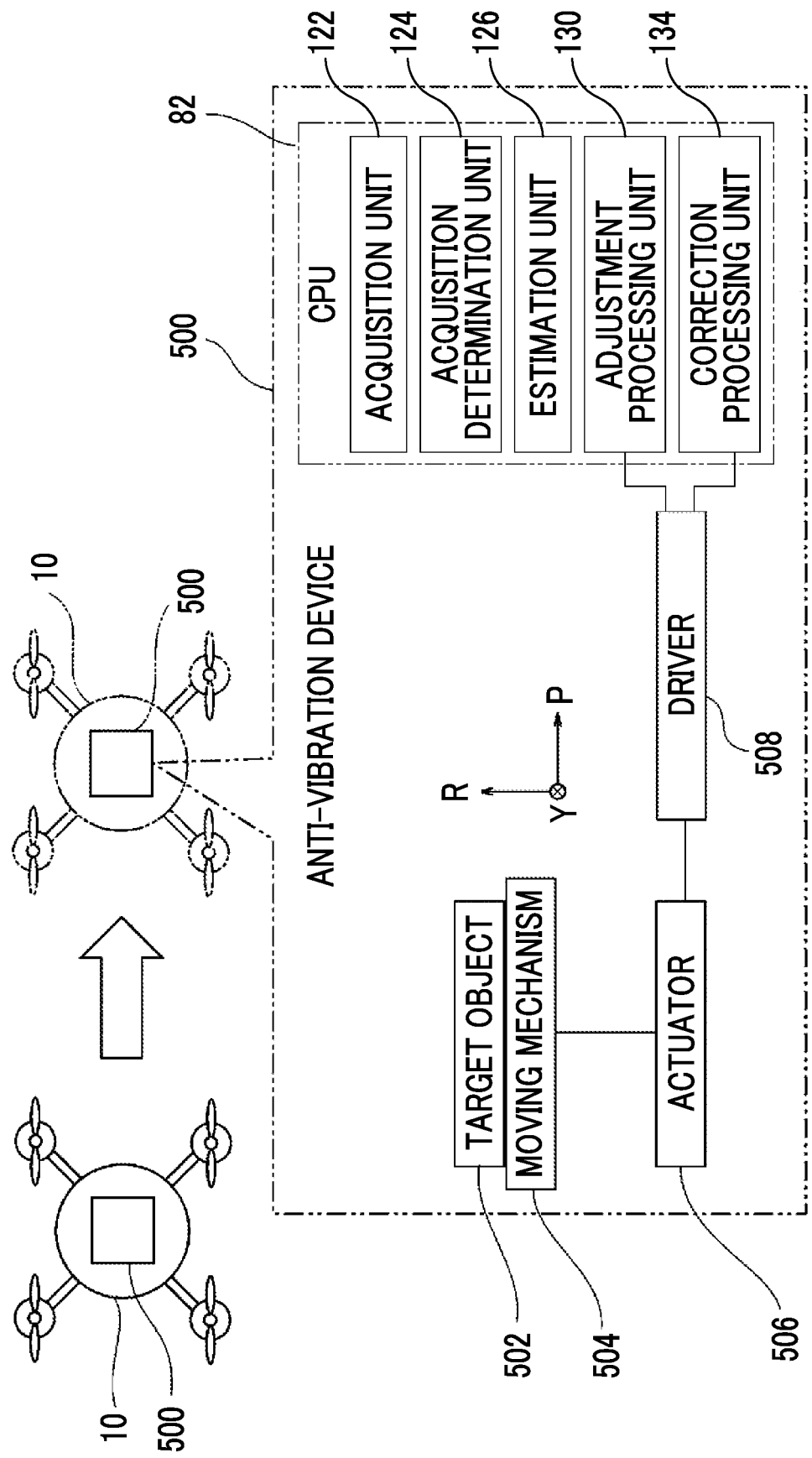
FIG. 27 is a block diagram showing a modification example of the imaging system.

In addition, as shown in FIG. 27 as an example, the technology according to the embodiment described above (that is, technology of executing the processes by the acquisition unit 122, the acquisition determination unit 124, the estimation unit 126, the adjustment processing unit 130, and the correction processing unit 134) may be applied to a flying object system comprising the flying object 10 and the anti-vibration device 500.

The anti-vibration device 500 includes a target object 502, a moving mechanism 504, an actuator 506, and a driver 508. The target object 502 is a target object of the anti-vibration by the anti-vibration device 500, and is supported by the moving mechanism 504. The actuator 506 adjusts the position of the moving mechanism 504 that moves the target object 502. The driver 508 controls the actuator 506 in accordance with the instruction the CPU 82. By controlling the actuator 506 via the driver 508, the adjustment processing unit 130 adjusts the position of the moving mechanism 504. The correction processing unit 134 corrects the shake applied to the target object 502 by using the moving mechanism 504 after the position of the moving mechanism 504 is adjusted by the adjustment processing unit 130.

In addition, the adjustment process by the adjustment processing unit 130 may be omitted. Similarly, the estimation process by the estimation unit 126 may be omitted.

In addition, the image acquired by the imaging processing unit 132 may be a moving image instead of a still image.

In addition, a vane anemometer may be used instead of the anemometer 160, and wind speed/wind direction information related to the wind speed and the wind direction of the flight environment may be transmitted from the vane anemometer to the imaging apparatus 50.

In addition, the factor information 204 includes the movement information 206, the wind information 208, the distance information 210, and the gimbal information 212, but the wind information 208, the distance information 210, or the gimbal information 212 may be omitted.

In addition, the distance information 210 is information indicating the object distance as an example of the distance L between the imaging apparatus 50 and the target object 2, but may be information indicating a distance other than the object distance. For example, the distance information 210 may be information obtained by measuring the distance L between the imaging apparatus 50 and the target object 2 by a stereo camera, a dual pixel camera, or a light detection and ranging (LiDAR) system.

In addition, although the setting unit 128 sets the shutter speed based on the factor information 204, the imaging condition other than the shutter speed (for example, sensitivity or frame rate) may be set based on the factor information 204. The imaging condition in this case is an example of an "imaging condition" according to the technology of the present disclosure.

In addition, in the embodiment described above, the form example has been described in which the imaging support program 120 is stored in the NVM 84, but the technology of the present disclosure is not limited to this. For example, the imaging support program 120 may be stored in a portable computer-readable non-temporary storage medium, such as an SSD or a universal serial bus (USB) memory. The imaging support program 120 stored in the non-temporary storage medium is installed in the computer 74 of the imaging apparatus 50. The CPU 82 executes the imaging support process in accordance with the imaging support program 120.

In addition, the imaging support program 120 may be stored in a storage device of another computer, a server device, or the like connected to the imaging apparatus 50 via a network, and the imaging support program 120 may be downloaded in response to a request of the imaging apparatus 50 and installed in the computer 74.

It should be noted that it is not necessary to store the entire imaging support program 120 in the storage device of another computer, a server device, or the like connected to the imaging apparatus 50, or the NVM 84, and a part of the imaging support programs 120 may be stored.

In addition, although the computer 74 is built in the imaging apparatus 50, the technology of the present disclosure is not limited to this, and for example, the computer 74 may be provided outside the imaging apparatus 50.

In the embodiment described above, the computer 74 is described as an example, but the technology of the present disclosure is not limited to this, and instead of the computer 74, a device including an application specific integrated circuit (ASIC), a field-programmable gate array (FPGA), or a programmable logic device (PLD) may be applied. In addition, instead of the computer, a hardware configuration and a software configuration may be used in combination.

As the hardware resource for executing the imaging support process described in the embodiment described above, the following various processors can be used. Examples of the processor include software, that is, a CPU, which is a general-purpose processor that functions as the hardware resource for executing the imaging support process by executing the program. In addition, examples of the processor include a dedicated electric circuit which is a processor having a circuit configuration designed to be dedicated to executing a specific process, such as an FPGA, a PLD, or an ASIC. A memory is built in or connected to any processor, and each processor executes the imaging support process by using the memory.

The hardware resource for executing the imaging support process may be composed of one of those various processors or may be composed of a combination of two or more processors of the same type or different types (for example, a combination of a plurality of FPGAs or a combination of a CPU and an FPGA). In addition, the hardware resource for executing the imaging support process may be one processor.

As an example of configuring with one processor, first, there is a form in which one processor is composed of a combination of one or more CPUs and software, and this processor functions as the hardware resource for executing the imaging support process. Second, as represented by system-on-a-chip (SoC), there is a form in which a processor that realizes the functions of the entire system including a plurality of hardware resources for executing the imaging support process with a single integrated circuit (IC) chip. As described above, the imaging support process is realized by using one or more of the various processors described above as the hardware resource.

Further, as the hardware structure of these various processors, more specifically, it is possible to use an electric circuit in which circuit elements, such as semiconductor elements, are combined. In addition, the imaging support process is merely an example. Therefore, it is needless to say that unnecessary steps may be deleted, new steps may be added, or the process order may be changed within a range that does not deviate from the gist.

The above described contents and shown contents are the detailed description of the parts according to the technology of the present disclosure, and are merely examples of the technology of the present disclosure. For example, the above descriptions of the configuration, the function, the action, and the effect are the descriptions of examples of the configuration, the function, the action, and the effect of the parts according to the technology of the present disclosure. Accordingly, it is needless to say that unnecessary parts may be deleted, new elements may be added, or replacements may be made with respect to the above described contents and shown contents within a range that does not deviate from the gist of the technology of the present disclosure. In addition, in order to avoid complications and facilitate understanding of the parts according to the technology of the present disclosure, in the above described contents and shown contents, the descriptions of common technical knowledge and the like that do not particularly require description for enabling the implementation of the technology of the present disclosure are omitted.

In the present specification, "A or B" is synonymous with "at least one of A or B". That is, "A or B" means that it may be only A, only B, or a combination of A and B. In addition, in the present specification, in a case in which three or more matters are associated and expressed by "or", the same concept as "A or B" is applied.

All documents, patent applications, and technical standards described in the present specification are incorporated into the present specification by reference to the same extent as in a case in which the individual documents, patent applications, and technical standards are specifically and individually stated to be incorporated by reference.

The following supplementary notes are further disclosed with regard to the embodiment described above.

Supplementary Note 1

A control method used in a system including a moving body and an anti-vibration device, the method including an adjustment step of adjusting a position of a moving mechanism that moves a target object of anti-vibration by the anti-vibration device, based on factor information including movement information related to a speed and a direction of the moving body, and a correction step of correcting a shake applied to the target object by using the moving mechanism after the adjustment step is executed.

Supplementary Note 2

A program causing a computer of an imaging apparatus mounted on a moving body to execute an acquisition process of acquiring factor information including movement information related to a speed and a direction of the moving body, an adjustment process of adjusting a position of a moving mechanism that moves an image sensor or an imaging lens, based on the factor information, an imaging process of imaging a subject by using the image sensor after the adjustment process is executed, and a correction process of correcting a shake applied to the image sensor or the imaging lens by using the moving mechanism in a case in which the imaging process is executed.

What is claimed is:

1. A control method used in a system including a moving body and an imaging apparatus, the method comprising:
    an acquisition step of acquiring factor information, including movement information related to the moving body, via the imaging apparatus;
    an adjustment step of adjusting a position of a moving mechanism that moves an image sensor or an imaging lens provided in the imaging apparatus, based on the factor information;
    an imaging step of imaging a subject by using the image sensor after the adjustment step is executed; and
    a correction step of correcting a shake applied to the image sensor or the imaging lens by using the moving mechanism in a case in which the imaging step is executed,
    wherein the adjustment step includes increasing a movable distance of the image sensor or of the imaging lens in a case in which the correction step is executed, as compared to a distance before the adjustment step is executed.

2. The control method according to claim 1, wherein the movement information is information based on instruction information related to a speed and a direction input to the moving body.

3. The control method according to claim 1, wherein the correction step is executed based on the factor information.

4. The control method according to claim 1, wherein the factor information includes wind information related to wind generated in an environment in which the moving body flies.

5. The control method according to claim 1, further comprising:
    a setting step of setting an imaging condition of the imaging apparatus based on the factor information.

6. The control method according to claim 5, wherein the imaging condition is a shutter speed.

7. The control method according to claim 1, wherein the factor information includes distance information related to a distance between the imaging apparatus and the subject.

8. The control method according to claim 1, wherein the factor information includes gimbal information related to a gimbal mechanism that supports the imaging apparatus with respect to the moving body.

9. The control method according to claim 8, wherein the gimbal information is information related to an axis of the gimbal mechanism or information related to a frequency band which is correctable by the gimbal mechanism with respect to the shake.

10. The control method according to claim 1, further comprising:
    an output step of outputting live view image data obtained by imaging the subject by using the image sensor to a display device in a state in which the position of the moving mechanism is maintained after the adjustment step is executed.

11. The control method according to claim 10, wherein the output step includes correcting the shake applied to the imaging apparatus, by using a gimbal mechanism that supports the imaging apparatus with respect to the moving body.

12. The control method according to claim 1, further comprising:
    a first estimation step of estimating first movement information related to a speed and a direction of the moving body based on the movement information, first acceleration sensor information included in the imaging apparatus, or first image information obtained by being captured using the image sensor.

13. The control method according to claim 1, further comprising:
    a second estimation step of estimating second movement information related to a speed and a direction of the moving body based on second acceleration sensor information included in the imaging apparatus or based on second image information obtained by being captured using the image sensor in a case in which the imaging apparatus fails to acquire the movement information.

14. The control method according to claim 1, wherein the moving body is a flying object.

15. The control method according to claim 1, wherein the moving body is an automobile.

16. The control method according to claim 1, wherein the factor information includes specification information for specifying an imaging direction of the imaging apparatus.

17. A control method used in a system including a moving body and an imaging apparatus, the method comprising:
    an acquisition step of acquiring factor information, including movement information related to the moving body, via the imaging apparatus;
    an adjustment step of adjusting a position of a moving mechanism that moves an image sensor provided in the imaging apparatus, based on the factor information;
    an imaging step of imaging a subject by using the image sensor after the adjustment step is executed; and
    a correction step of correcting a shake applied to the image sensor by using the moving mechanism that in a case in which the imaging step is executed,
    wherein the adjustment step includes increasing a movable distance of the image sensor in a case in which the correction step is executed, as compared to a distance before the adjustment step is executed.

18. An imaging apparatus mounted on a moving body, the apparatus comprising:

a processor, wherein the processor is configured to execute:

an acquisition process of acquiring factor information including movement information related to the moving body;

an adjustment process of adjusting a position of a moving mechanism that moves an image sensor or an imaging lens provided in the imaging apparatus, based on the factor information;

an imaging process of imaging a subject by using the image sensor after the adjustment process is executed; and a correction process of correcting a shake applied to the image sensor or the imaging lens by using the moving mechanism in a case in which the imaging process is executed, wherein the adjustment process includes increasing a movable distance of the image sensor or of the imaging lens in a case in which the correction process is executed, as compared to a distance before the adjustment process is executed.

19. The imaging apparatus according to claim 18, wherein the movement information is information based on instruction information related to a speed and a direction input to the moving body.

20. The imaging apparatus according to claim 18, wherein the factor information includes wind information related to wind generated in an environment in which the moving body flies.

* * * * *